United States Patent
Mori et al.

(10) Patent No.: US 6,493,465 B2
(45) Date of Patent: Dec. 10, 2002

(54) MATCHING POINT EXTRACTING METHOD AND APPARATUS THEREFOR

(75) Inventors: Katsuhiko Mori, Kawasaki; Katsumi Iijima, Hachioji; Kotaro Yano, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,127

(22) Filed: Feb. 20, 1997

(65) Prior Publication Data
US 2002/0039438 A1 Apr. 4, 2002

(30) Foreign Application Priority Data

Feb. 21, 1996 (JP) .............................................. 8-057055
Jul. 5, 1996 (JP) .............................................. 8-194103

(51) Int. Cl.[7] ................................................. G06K 9/62
(52) U.S. Cl. ...................................... 382/209; 382/199
(58) Field of Search ............................... 382/154, 100, 382/103, 107, 199, 219, 205, 206, 209, 215, 217, 225, 236, 278, 280, 260, 173; 348/19, 155, 172, 416, 669, 170, 701, 407, 413; 364/221.9, 232.22, 240, 253.1, 280, 822

(56) References Cited

U.S. PATENT DOCUMENTS

| | | | | |
|---|---|---|---|---|
| 5,247,583 A | * | 9/1993 | Kato et al. ................... | 382/225 |
| 5,557,543 A | * | 9/1996 | Parsons ....................... | 701/207 |
| 5,606,376 A | * | 2/1997 | Shinohara .................... | 348/19 |
| 5,734,743 A | * | 3/1998 | Matsugu et al. ............. | 382/154 |

\* cited by examiner

*Primary Examiner*—Samir Ahmed
(74) *Attorney, Agent, or Firm*—Fitzpatrick, Cella, Harper & Scinto

(57) ABSTRACT

This invention provides a matching point extracting method and an apparatus therefor, for extracting the matching points among plural images based on the template matching method. The method consists of forming mutually different plural templates from an arbitrary one of plural images, and determining the matching points in the plural images, in an image area showing a specified condition, by utilizing one of thus formed plural templates, thereby enabling highly prescise extraction of the matching points over the entire image area, without difference between the object and the background in the image.

21 Claims, 39 Drawing Sheets

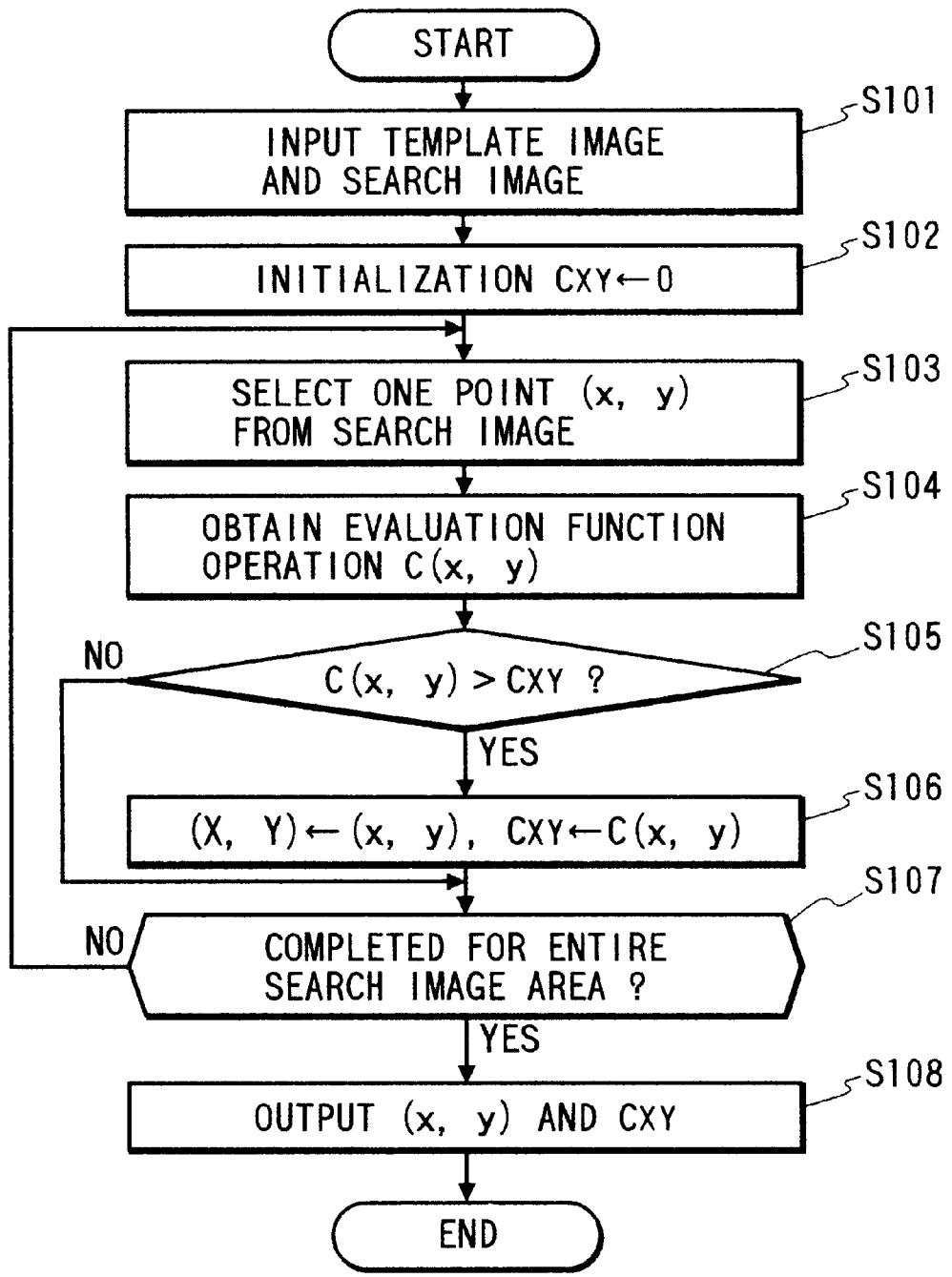

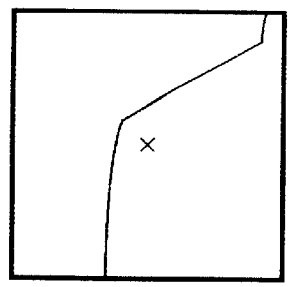
FIG. 11A  FIG. 11B  FIG. 11C  FIG. 11D
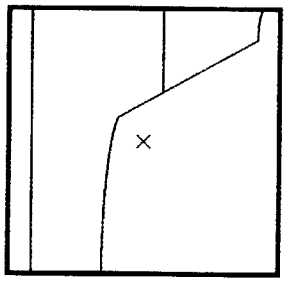
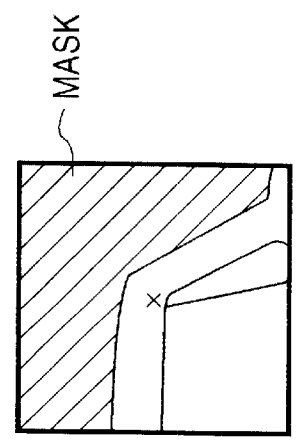
FIG. 11E
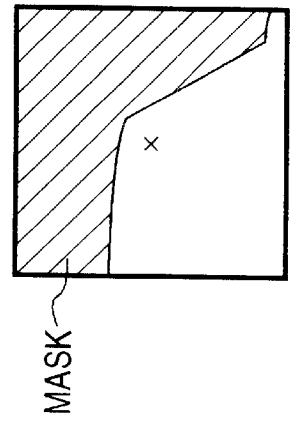
FIG. 11F

FIG. 17A

| Crxy \ Clxy | HIGH | MID. | LOW |
|---|---|---|---|
| HIGH | MATCH | SMALL | SMALL |
| MID. | SMALL | SMALL | SMALL |
| LOW | SMALL | SMALL | SMALL |

Chth, Clth (column thresholds); Chth, Clth (row thresholds)

FIG. 17B

| Crxy \ Clxy | HIGH | MID. | LOW |
|---|---|---|---|
| HIGH | SMALL | SMALL | LARGE |
| MID. | SMALL | SMALL | LARGE |
| LOW | LARGE | LARGE | LARGE |

FIG. 17C

| Crxy \ Clxy | HIGH | MID. | LOW |
|---|---|---|---|
| HIGH | MATCH | NON | NON |
| MID. | NON | NON | NON |
| LOW | NON | NON | NON |

FIG. 17D

| Crxy \ Clxy | HIGH | MID. | LOW |
|---|---|---|---|
| HIGH | NON | NON | LARGE |
| MID. | NON | NON | LARGE |
| LOW | LARGE | LARGE | LARGE |

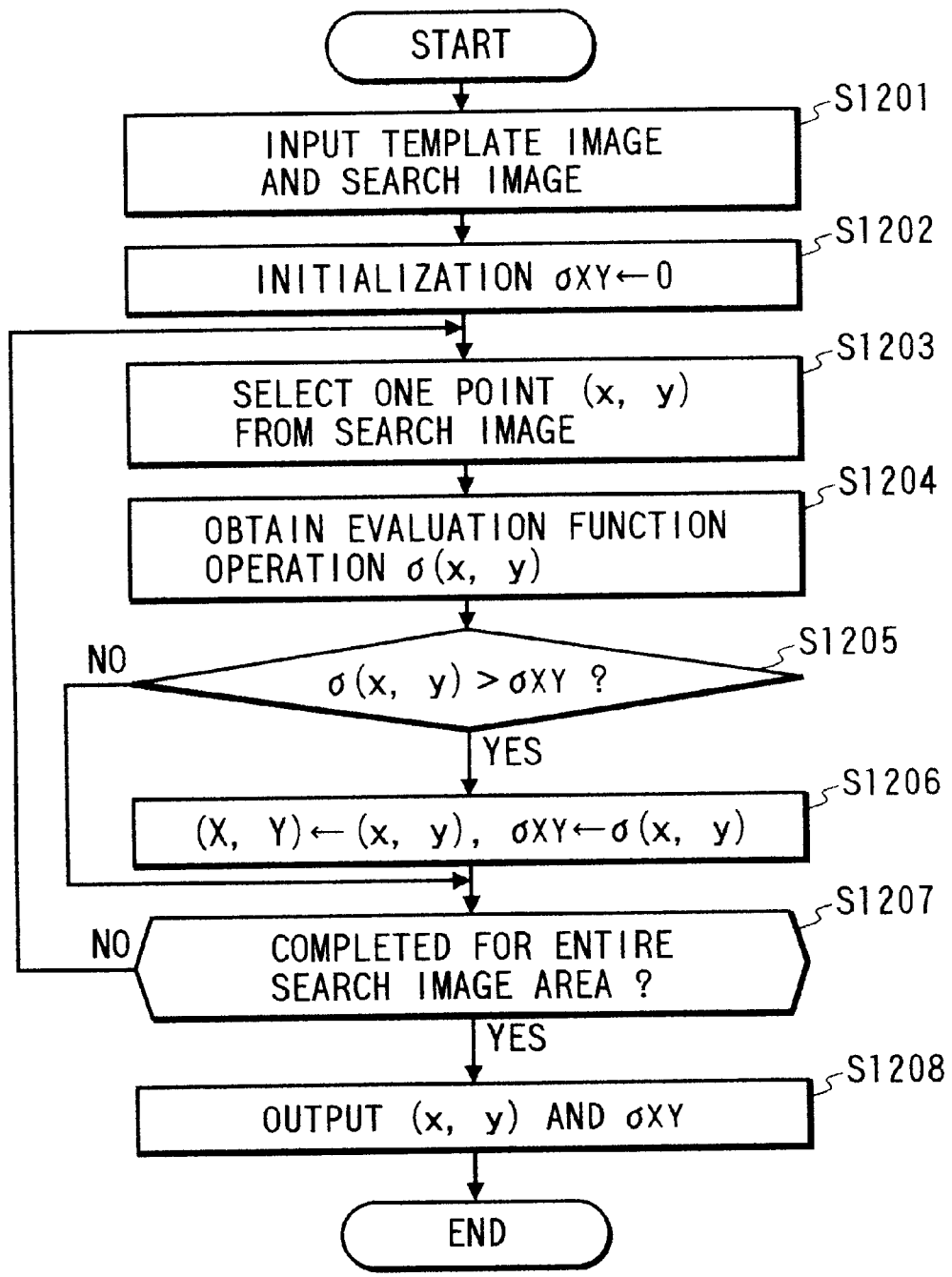

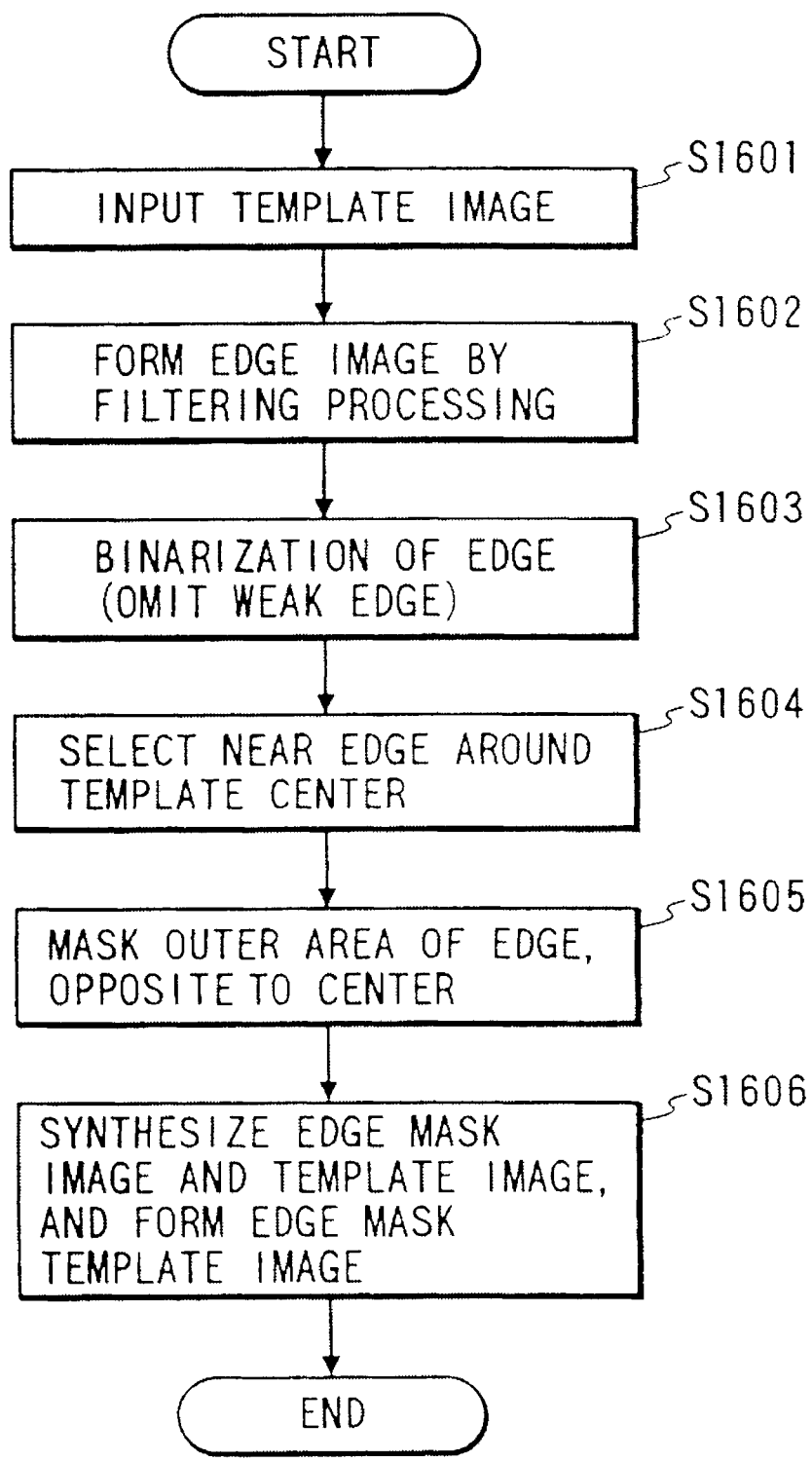

FIG. 30A

|  σlxy / σrxy  | HIGH  | MID.  | LOW   |
|---------------|-------|-------|-------|
| HIGH          | MATCH | SMALL | SMALL |
| MID.          | SMALL | SMALL | SMALL |
| LOW           | SMALL | SMALL | SMALL |

σhth, σlth indicated at top; σhth, σlth indicated on left side.

FIG. 30B

|  σlxy / σrxy  | HIGH  | MID.  | LOW   |
|---------------|-------|-------|-------|
| HIGH          | SMALL | SMALL | LARGE |
| MID.          | SMALL | SMALL | LARGE |
| LOW           | LARGE | LARGE | LARGE |

FIG. 30C

|  σlxy / σrxy  | HIGH  | MID.  | LOW   |
|---------------|-------|-------|-------|
| HIGH          | MATCH | NON   | NON   |
| MID.          | NON   | NON   | NON   |
| LOW           | NON   | NON   | NON   |

FIG. 30D

|  σlxy / σrxy  | HIGH  | MID.  | LOW   |
|---------------|-------|-------|-------|
| HIGH          | NON   | NON   | LARGE |
| MID.          | NON   | NON   | LARGE |
| LOW           | LARGE | LARGE | LARGE |

MATCHING POINT EXTRACTING METHOD AND APPARATUS THEREFOR

BACKGROUND OF THE INVENTION

1. Field of the Invention

The present invention relates to a matching point extracting method, in determining distance information on an object based on plural images of such an object taken from mutually different positions, for extracting mutually matching points in such images.

2. Related Background Art

Such an apparatus for extracting the matching points of the images has conventionally been utilized, for example, in producing a control program for a moving robot or cutting out the image data of a predetermined object from image data of a phototaken image.

In such a matching point extracting apparatus, for determining the distance to the object in the image, there are known, for example, a method shown in FIG. 1A of employing two or more cameras 133a, 133b for taking the images of the object 131 from different viewing points and utilizing the parallax between the images obtained by such cameras 133a, 133b, and a method shown in FIG. 1B of employing one camera 134, and moving such a camera 134 for taking the images of the object 132 from different viewing points and utilizing the parallax between the time-sequentially obtained images. In these methods shown in FIGS. 1A and 1B, the extraction of the matching points is executed for obtaining the parallax required in the determination of the object distance.

More specifically, in the method shown in FIG. 1A, the matching points are determined in all the points (pixels) in the image data of the image obtained by the left-side camera 133a and in those of the image obtained in synchronization by the right-side camera 133b. Also in the method shown in FIG. 1B, the matching points are determined in all the points (pixels) in the image data of an image obtained at a certain position and in those of another image obtained at a position after movement. The determination is made in all the pixels (points) of the image data because the area of the object within the image is not known.

Among the representative methods for such a matching point extraction, there is known a template matching method. In this method, around a point P for which a matching point is to be determined, in FIG. 2A, a template (template image) 143 is prepared as shown in FIG. 2A and is moved over the entire area of a searched image 142 as shown in FIG. 2B, with a calculation of the similarity at every point and a point showing the highest similarity is determined as the matching point.

As the evaluation function for determining the similarity, there can be employed a following function (1) utilizing the difference in the luminance (pixel values) or a following function (2) utilizing the correlation of the luminance (pixel values):

$$E(x, y) = \sum_i \sum_j [F(i, j) - A(i-x, j-y)]^2 \quad (1)$$

$$\sigma(x, y) = \frac{\sum_i \sum_j \{(i, j) - A(i-x, j-y)\}}{\sqrt{\sum_i \sum_j F^2(i, j)} \cdot \sqrt{\sum_i \sum_j A^2(i, j)}} \quad (2)$$

In the foregoing equations (1) and (2), F(i, j) indicates the luminance value of the pixel at a coordinate (i, j) on the template image, and A(i, j) indicates the luminance value of the pixel at a coordinate (i-x, i-y) on the image to be searched (hereinafter, called a search image). Thus, the function (1) or (2) represents the similarity when the position of the template image is moved by (x, y) on the search image.

With the function (1), the matching point is indicated at a point where E(x, y) reaches a minimum, which can theoretically reach 0 at a minimum. With the function (2), the matching point is indicated at a point where σ(x, y) reaches a maximum, which can theoretically reach 1 at a maximum.

For determining the similarity there is also known the following other evaluation function (3). It determines the number of pixels, within the entire template, for which the difference between the luminance value (pixel value) of such a pixel and the luminance value of a pixel in the search image is within a predetermined threshold value ϵ, namely it determines the numbers of the pixels in the template, having differences in the luminance value within a predetermined value from each pixel of the search image, and a point on the search images showing the largest number of such pixels is defined as the matching point to the center point of the template:

$$kij = \begin{cases} 1 (\|F(i, j) - A(i-x, j-y)\| < \varepsilon) \\ 0 (\|F(i, j) - A(i-x, j-y)\| \geq \varepsilon) \end{cases} \quad (3)$$

$$C(x, y) = \sum_i \sum_j kij$$

With this function (3), the matching point is indicated at a point where C(x, y) reaches a maximum, which can theoretically reach the number of all the pixels in the template at a maximum.

Conventionally, the object distance is determined from the images, by extracting the matching points from the images, determining the amount of parallax in each point of the image, and effecting trigonometry based on such amount of parallax, focal length and positional information of the camera.

Such a template matching method, however, in extracting the matching points between the images that have recorded an object at a finite distance from the cameras, has been associated with a drawback that the precision of extraction becomes significantly deteriorated at a certain portion of the object.

Such a drawback will be explained with reference to FIGS. 3A to 3C, which show images having recorded a car as the main object, by the two cameras 133a, 133b shown in FIG. 1A, wherein FIG. 3A shows an image obtained by the left-side camera 133a while FIGS. 3B and 3C show images obtained by the right-side camera 133b. For the convenience of explanation, the car is considered as the main object while the house and the tree are considered as the background and are assumed to be distant from the car and positioned in the back of the scene.

Now, there is considered a case of cutting out a template (template image) from the image shown in FIG. 3A, taken as a reference image. In this operation, a certain size is required for the template.

This is because the area of a point A in the sky or a point B in the door of the car in the image shown in FIG. 3A shows little change in the luminance, lacking conspicuous features and having similar luminance values therearound. Also, the area of superposed leaves of the tree at a point C has the area of similar luminance distribution therearound, and, for the extraction of exact matching points in such areas A, B and C, the template needs a certain size for detecting the variation in the distribution of the luminance.

For example, if the template is defined in the illustrated size around the point B in FIG. 3A, the template 151 contains a type in addition to the door of the car, thus showing a large variation in the luminance and allowing an exact determination of the matching point.

Now, let us consider a point D at an end of the car, which is the main object in the image shown in FIG. 3A. If the template 152 is prepared around the point D, with a same size as around the point B, the template 152 includes the house in the background, in addition to the car constituting the main object. The matching point extraction with such a template 512 results as shown in FIG. 3C, in an erroneous matching point F instead of the correct matching point E.

Such an erroneous matching results from a fact that, in the calculation of the evaluation function (similarity) in the example shown in FIGS. 3A to 3C, with respect to a point E of the search image, an area corresponding to the car in the template image shows a high similarity because the image remains the same in the template image and in the search image and an area corresponding to the background of the template image shows a low similarity because of the change in the image, whereby the point E is judged as not the matching point, whereas, with respect to a point F of the search image, the area corresponding to the background of the template image shows a high similarity because the image remains the same in the template image and the search image and the area corresponding to the car of the template image also shows a high similarity because of an eventually high proportion of the area of similar luminance values despite the change in the image, whereby the point F is finally judged as the matching point.

Such an erroneous matching is a phenomenon generally resulting from a fact that the car constituting the main object is positioned in front of the house and the tree constituting the background, thus providing a difference in the parallax. Thus, in the case of taking an object at a finite distance as the main object, the accuracy of the matching point extraction is deteriorated in an area close to the boundary between the main object and the background, or, if the main object contains a portion showing a significant change in the object distance, in an area close to the boundary of such a portion.

As explained in the foregoing, in employing the conventional template matching method for the matching point extraction, the template is required to have a certain size, but the template of such a certain size results in a deterioration in the accuracy of matching point extraction in an area close to the boundary between the main object and the background.

On the other hand, the evaluation function (3) is effective, to a certain extent, for preventing the above-mentioned deterioration of the accuracy of the matching point extraction in the area close to the boundary between the main object and the background.

However, for example, when the background occupies a major portion of the template, the number of pixels in the template showing differences in luminance within the threshold value ε from a pixel in the search image becomes larger in a portion corresponding to the main object in the template image than in a portion corresponding to the background, whereby the accuracy of matching point extraction becomes deteriorated.

Another drawback lies in a fact that an occlusion area, which exists in the images prepared as shown in FIGS. 1A and 1B and which does not have the matching point, is difficult to detect.

Such a drawback will be explained with reference to FIGS. 4A and 4B, showing images obtained by the two cameras 133a, 133b shown in FIG. 1A.

As an example, the matching point for a point I in the image shown in FIG. 4A is hidden by the car in the image shown in FIG. 4B and does not exist, therefore, in this image. Such an area is called an occlusion area, and does not contain the matching point, so that the matching point extraction should be inhibited even if the similarity is evaluated as high.

For identifying such an occlusion area, there is known a method of at first preparing a template image around a point in the reference image, then searching, on the search image, a candidate matching point for a certain point (center point of the template image) of the reference image, preparing a new template image around the thus obtained candidate matching point in the search image, and searching a candidate matching point on the reference image which is now taken as a search image, utilizing the thus prepared new template image around the first-mentioned candidate matching point. If the candidate matching point searched in the reference image coincides with the center point of the initially prepared template, the candidate matching point in the search image is identified as the matching point for the center point of the initially prepared template image, but, in the case of absence of coincidence, it is identified that the matching point does not exist.

However, such a method has a drawback of possibility of erroneous matching, for example, in the case a point J in the reference image shown in FIG. 4A erroneously extracts a candidate matching point K in the search image shown in FIG. 4B because of a window in the background and the template image prepared around the point K again erroneously extracts the point J in the reference image as a candidate matching point, namely in the case of doubled erroneous extractions, or in case a point L in the reference image shown in FIG. 4A correctly extracts a point M in the search image in FIG. 4B, but such a point M erroneously extracts a candidate matching point N in the reference image shown in FIG. 4A because of the tree and the ground in the background.

SUMMARY OF THE INVENTION

An object of the present invention is to provide a matching point extracting method capable of resolving the above-mentioned drawbacks, and an apparatus therefor.

Another object of the present invention is to provide a matching point extracting method, enabling highly precise matching point extraction in the entire area of the image to be used, without distinction of the object and the background therein, and an apparatus therefor.

The above-mentioned objects can be attained, according to an embodiment of the present invention, by a matching point extracting method and an apparatus therefor for determining matching points between plural images based on the template matching method, comprising:

a template formation step of preparing mutually different plural templates from an arbitrary one of the plural images; and a matching point determination step of determining the matching points of the plural images, utilizing, in an image area showing a specified condition, one of the plural templates prepared in the template formation step.

Still another object of the present invention is to provide a matching point extracting method, enabling matching point extraction within a short time in the entire area of the image to be used, without distinction of the object and the background therein, and an apparatus therefor.

The above-mentioned object can be attained, according to an embodiment of the present invention, by a matching point extracting method and an apparatus therefor for determining matching points between plural images based on the template matching method, comprising:

a first template formation step of preparing an initial template from one of plural input images;

a similarity operation step of determining a similarity utilizing the pixel value of each pixel in the template prepared in the first template formation step and the pixel value of each pixel in another of the input images;

a decision step of judging a specified condition based on the similarity determined in the similarity operation step; and a second template formation step of preparing another template based on the result of a judgment in the judgment step.

Still another object of the present invention is to provide a matching point extracting method and an apparatus therefor capable of precisely determining an occlusion area or an area containing a large change in the distance in the image to be used, thereby enabling highly precise matching point extraction.

The above-mentioned object can be attained, according to an embodiment of the present invention, by a method for extracting, in synthesizing plural images, matching points of such plural images and an apparatus therefor, comprising:

a template image data formation step of entering plural sets of image data each corresponding to an image of an image frame, taking an image represented by the image data corresponding to an image frame among the thus entered image data of plural image frames as a reference image, extracting the image data, corresponding to a partial area in such a reference image, as a template image and outputting the template image data corresponding to the thus extracted template image;

a matching candidate extracting step of comparing the values of the pixel data constituting the template image data outputted by the template image data formation step with the pixel data constituting the image data corresponding to each of search images which are the images, other than the reference image, of the image data of the plural image frames entered in the template image data formation step, determining the number of pixel data showing differences smaller than a predetermined value, calculating the similarity of such a search image to the template image according to such a number of pixel data, extracting the search image showing a maximum similarity as a matching candidate for such a template image, and outputting such a matching candidate together with such a similarity;

a decision step of judging, based on the similarity data outputted by the matching candidate extraction step, whether the pixel data constituting the template image satisfy a predetermined condition; and a template image changing step of, when the decision step identifies that the pixel data constituting the template image satisfy such a specified condition, changing the shape of the template image represented by the template image data outputted by the template image formation step and outputting such a changed template image to the matching candidate extraction step.

Still other objects of the present invention, and the features thereof, will become fully apparent from the following detailed description of the embodiments, to be taken in conjunction with the attached drawings.

BRIEF DESCRIPTION OF THE DRAWINGS

FIG. 6 is a flow chart showing the process in a pixel number calculation unit in the first embodiment;

FIGS. 11A, 11B, 11C, 11D, 11E and 11F are views showing an example of the formation of an edge mask template image;

FIGS. 17A, 17B, 17C and 17D are views showing a decision process in a decision unit in the fourth embodiment;

FIG. 19 is a flow chart showing the process in an evaluation function operation unit in the apparatus shown in FIG. 18;

FIG. 23 is a flow chart showing the process in an edge mask template formation unit in the above-mentioned apparatus;

FIGS. 30A, 30B, 30C and 30D are views showing tables to be used by a decision unit in the above-mentioned apparatus;

DETAILED DESCRIPTION OF THE PREFERRED EMBODIMENTS

Now, the present invention will be explained in detail by preferred embodiments thereof, with reference to the attached drawings.

At first there will be explained a first embodiment of the present invention, with reference to FIGS. 5 to 8B.

Figure 5:
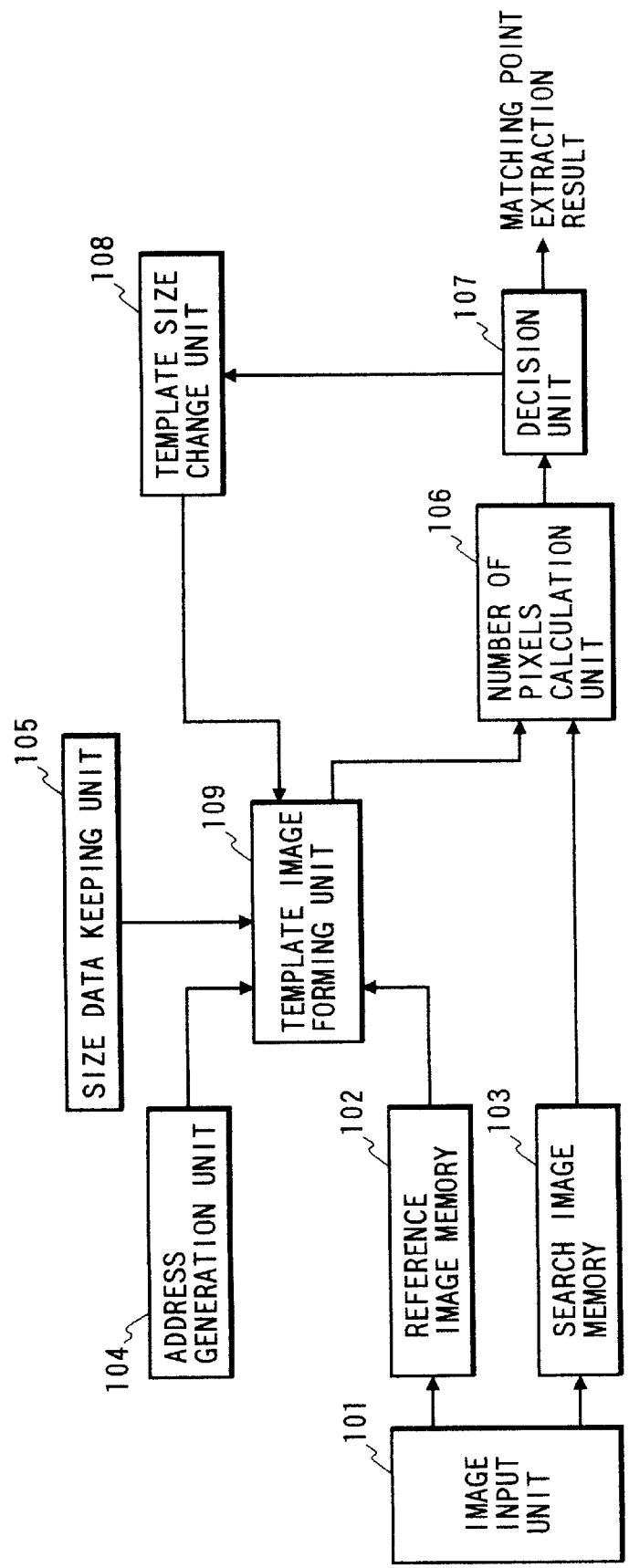
FIG. 5 is a schematic block diagram of a matching point extracting apparatus constituting a first embodiment of the present invention.

FIG. 5 is a schematic block diagram of a matching point extracting apparatus, constituting the first embodiment.

As shown in FIG. 5, the matching point extracting apparatus of the present embodiment is provided with an image input unit 101, a reference image memory 102, a search image memory 103, an address generation unit 104, a size data keeping unit 105, a pixel number calculation unit 106, a decision unit 107, a template size changing unit 108 and a template image formation unit 109, which are constructed by an electronic computer such as a microcomputer composed principally of a CPU, a ROM, a RAM, etc.

Figure 1A:
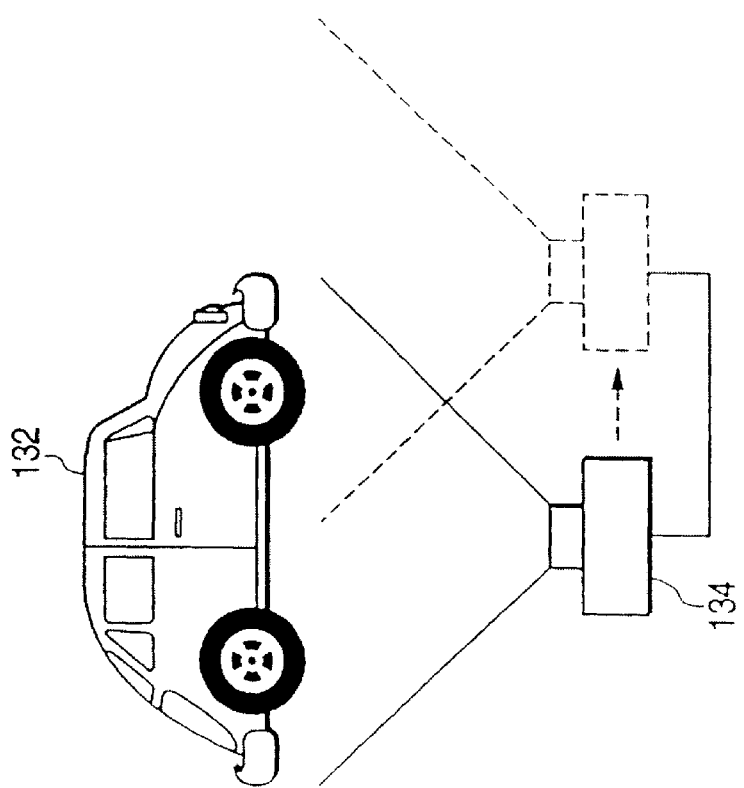
FIGS. 1A and 1B are schematic views showing general image input methods by an image input unit.
Figure 1B:
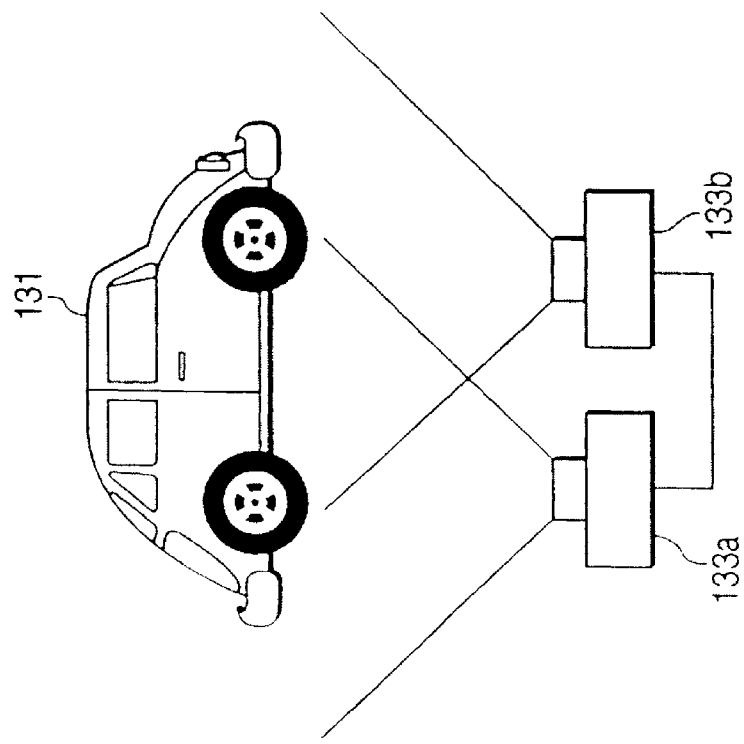
Figure 2A:
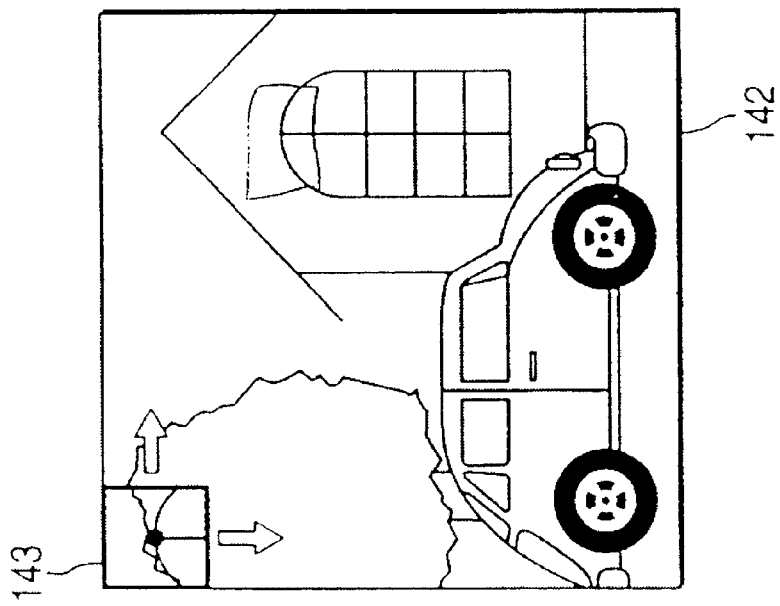
FIGS. 2A and 2B are schematic views showing an ordinary template matching method.
Figure 2B:
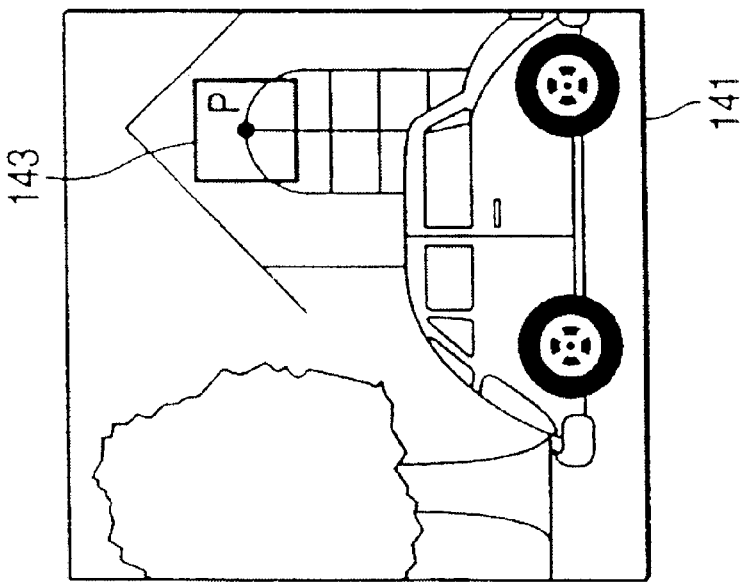
Figure 3C:
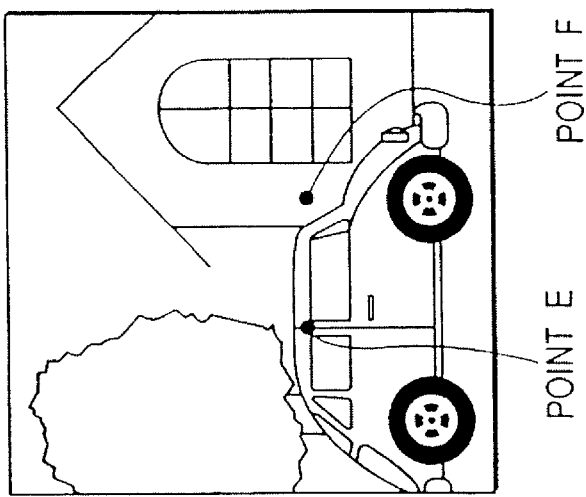
FIGS. 3A, 3B and 3C are schematic views showing, as a drawback in the prior art, an erroneous extraction in a conventional matching point extracting apparatus.
Figure 3B:
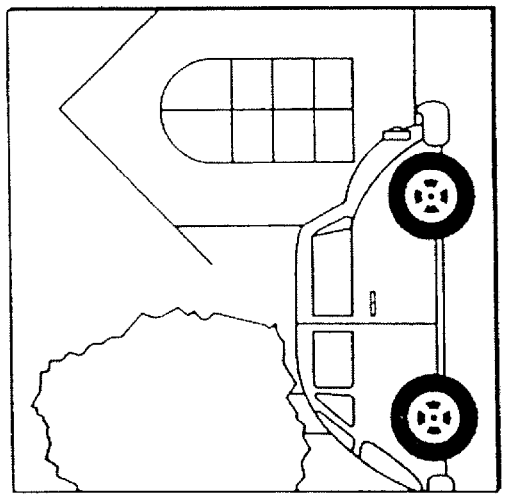
Figure 3A:
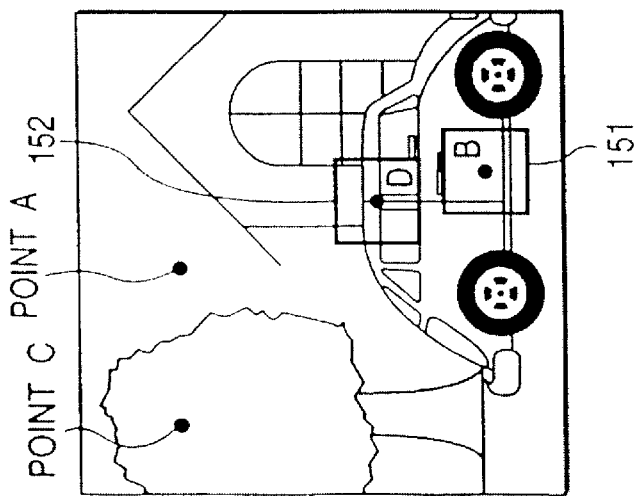

The image input unit 101 receives and processes the image data of plural images of a same object, taken from different viewing points as shown in FIGS. 1A and 1B, and may or may not include one or two cameras.

The reference image memory 102 stores, as a reference image, the image data of an arbitrarily selected one among the image data of the plural images of the same object, taken from different viewing points and entered by the image input unit 101, and the search image memory 103 stores other image data as search images.

The address generation unit 104 supplies the template image formation unit 109 with an address indicating a point of the reference image stored in the reference image memory 102, while the size data keeping unit 105 supplies the template image formation unit 109 with size data of an initial template image, and the template size changing unit 108 supplies the template image formation unit 109 with smaller size data, indicating the change of the template image, based on a changing instruction from the decision unit 107.

The template image formation unit 109 forms a template image by cutting out, from the reference image in the reference image memory 102, an area having the center indicated by the address supplied from the address generation unit 104 and having a size supplied from the size data keeping unit 105 or from the template size keeping unit 108 and supplies the pixel number calculation unit 106 with such a template image. The size of the template image data supplied from the template size changing unit 108 is smaller than that supplied from the size data keeping unit 105.

The pixel number calculation unit 106 calculates, with respect to the template image supplied from the template image formation unit 109 and the search image supplied from the search image memory 103, the number of pixels in the entire template image showing differences in the luminance value within a predetermined threshold value $\epsilon$ with respect to each pixel in the search image according to the aforementioned function (3), namely calculating the number of pixels of the template image having differences in the luminance value within a predetermined value from each pixel of the search image, then determines a candidate matching point based on such a number of pixels, calculates the similarity of the candidate matching point and supplies the decision unit 107 with such a candidate matching point and the calculated similarity.

The decision unit 107 judges, when the template image has a large size, whether the center point of the template image belongs to an area with a significant variation in the object distance (namely, an area with a rapid variation in the parallax distribution) within the template image, based on the similarity obtained from the pixel number calculation unit 106, and, when the center point belongs to such an area, instructs the template size changing unit 108 to supply the template image formation unit 109 with smaller size data of the template image.

In response to the supply of such smaller size data based on such an instruction, the template image formation unit 109 forms a template image corresponding to the supplied smaller size data, and the pixel number calculation unit 106 again calculates the similarity based on the template image of the smaller size and sends a candidate matching point to the decision unit 107.

When the center point of the template image does not belong to the area with a significant variation in the object distance, or when the template image has a smaller size, the decision unit 107 decides the candidate matching point, supplied from the pixel number calculation unit 106 as the matching point and outputs such a matching point.

In the following, there will be given a detailed explanation of the process of the pixel number calculation unit 106, with reference to a flow chart in FIG. 6, in which the coordinate of the candidate matching point is represented by (X, Y) and the similarity calculated according to the function (3) is represented by Cxy.

The pixel number calculation unit 106 at first accesses a template image and a search image (step S101), and initializes the similarity Cxy to "0" (step S102). It then selects a point (x, y) from the search image (step S103), compares the luminance value of such a point with that of all the pixels in the template image, calculates the number of pixels in the template image showing differences within a predetermined threshold value e, and sets such a number of pixels as the evaluation value or the similarity C(x, y) (step S104).

It then compares the similarity C(x, y) set in the step S104 with a current similarity Cxy (step S105), and, if the former is larger, it substitutes the coordinate (X, Y) with (x, y) as the candidate matching point and also substitutes the similarity Cxy with C(x, y) (step S106), and the sequence proceeds to a step S107. On the other hand, if the similarity C(x, y) set in the step S104 does not exceed the current similarity Cxy, the sequence skips the step S106 and proceeds to the step S107.

The step S107 discriminates whether the process of the steps S103 to S106 is completed for all the points in the search image, and, if completed, the coordinate (X, Y) and the similarity Cxy of the currently retained candidate matching point are outputted (step S108) and the sequence is terminated. On the other hand, if the process is not completed, the sequence returns to the step S103 to repeat the determination of the coordinate and the similarity of the candidate matching point for a next point.

In the following, there will be explained the method of judging, in the decision unit 107, whether the center point of the template image belongs to an area with a significant variation in the object distance.

Such a judgment is made by the comparison of the similarity Cxy and a predetermined threshold value Cth, because of the following reason to be explained with reference to FIGS. 7A to 7C, 8A and 8B.

Figure 7A:
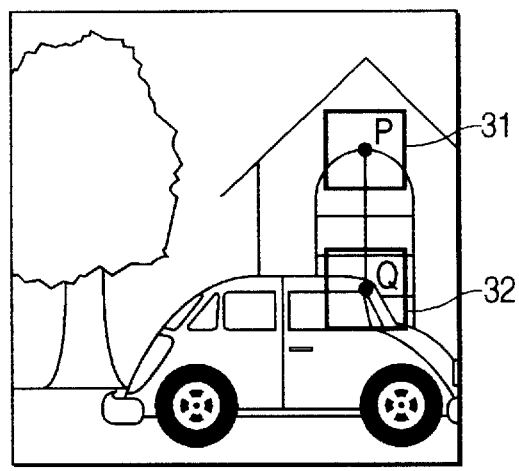
FIGS. 7A, 7B, 7C, 8A and 8B are schematic views showing a judging method for judging whether the center point of the template image is in an area where the object distance shows a significant change.
Figure 7B:
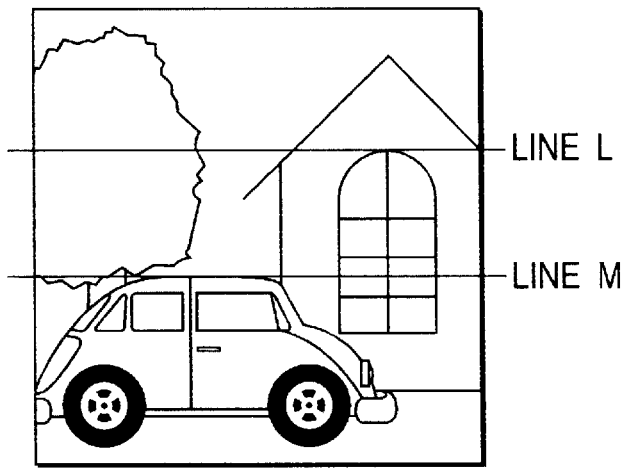
Figure 7C:
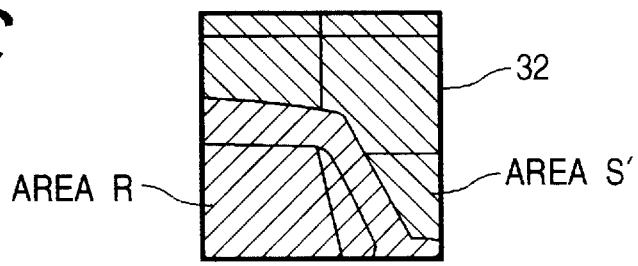
Figure 8A:
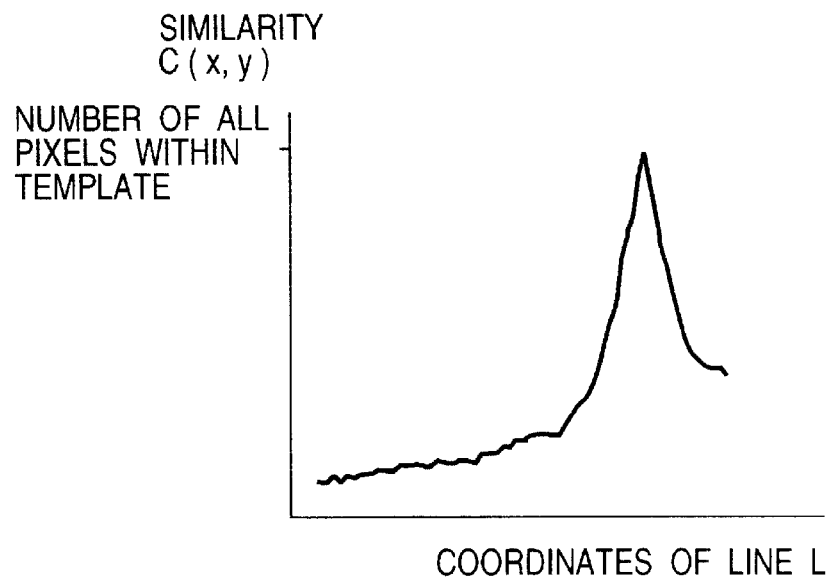

In the case of forming a template 31 around a point P in the reference image shown in FIG. 7A and searching a matching point, corresponding to the point P, in the search image shown in FIG. 7B, the similarity C(x, y) for example on a line L can be plotted as shown in FIG. 8A. In this case, since the point P does not belong to an area with a significant variation in the object distance, there can be obtained a high peak value in the similarity C(x, y) as shown in FIG. 8A, and, such a high peak point of the similarity C(x, y) can be determined as the matching point.

Figure 8B:
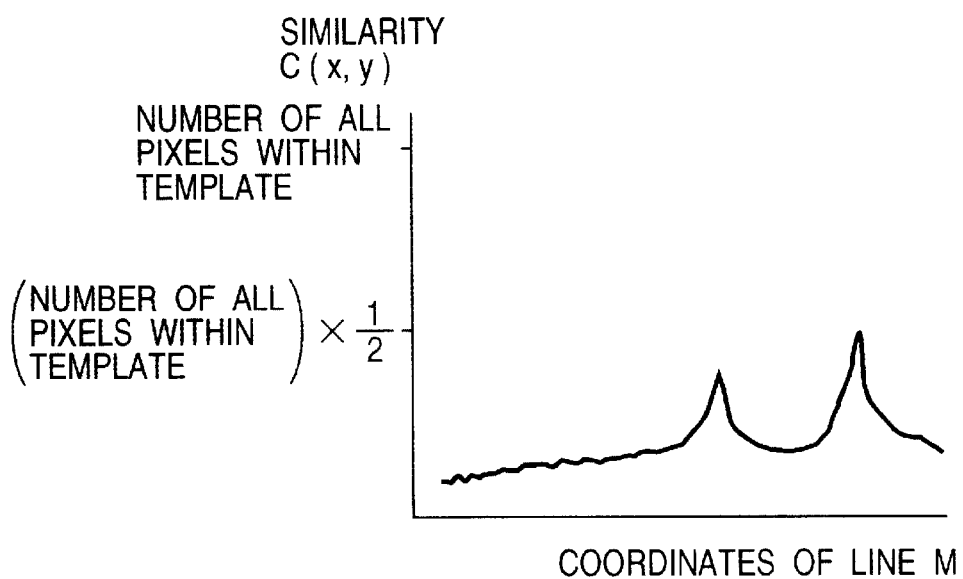

On the other hand, in the case of forming a template 32 around a point Q in the reference image shown in FIG. 7A and searching a matching point, corresponding to the point Q, in the search image shown in FIG. 7B, the plotting of the similarity C(x, y) on a line M shows two peaks as shown in FIG. 8B. This is because the template image contains an area with a significant variation in the object distance, and the left-side peak is provided by a similarity C(x, y) increased by an area R in the template image in FIG. 7C, while the right-side peak is provided a high similarity by an area S in the template image.

As will be apparent from the comparison of FIGS. 7A and 7B, the similarity of the candidate matching point for a point present in the area with a significant variation in the object distance is considerably smaller than that of the point in other areas.

Based on such a fact, the comparison of the obtained similarity Cxy and the predetermined threshold value Cth provides the ability to judge whether the center point of the template image belongs to an area with a significant variation of the object distance.

As explained in the foregoing, when the center point of the template image is identified as belonging to the area with a significant variation in the object distance, the decision unit 107 instructs the template size changing unit 108 to send the data of a smaller size to the template image forming unit 109, thereby executing the matching point extraction with a template image of a smaller size.

Such a size change of the template image provides the ability to prevent an erroneous matching point extraction resulting from the steep variation of the parallax distribution, based, for example, on the influence of the background area, thereby enabling highly precise matching point extraction and highly precise determination of the distance distribution of the object.

In the foregoing description, the template image is assumed to have two sizes, namely larger and smaller, but the size may be changed in three or more levels, for example, by reducing the size of the template image further, for example, if the background area is still larger than the area of the main object even in the template image of the smaller size.

In the present embodiment, the area with a significant variation in the object distance is identified by the maximum similarity Cxy and the threshold value Cth, but such an area may also be identified by employing a second largest similarity C'xy and estimating that the similarity C(x, y) has plural peaks when C'xy is larger than another threshold value C'th (C'th<Cth).

In the following, there will be explained a second embodiment of the present invention, with reference to FIGS. 9, 10, and 11A to 11F.

Figure 9:
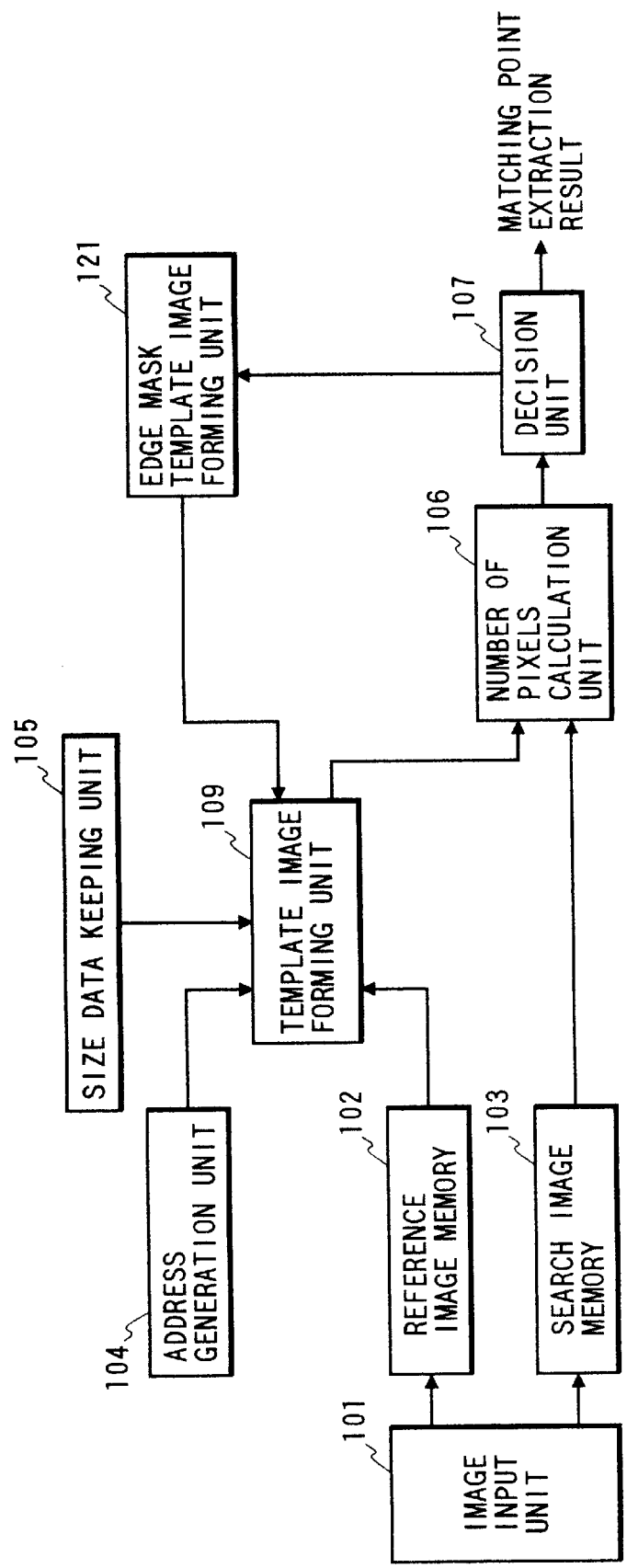
FIG. 9 is a schematic block diagram of a matching point extracting apparatus constituting a second embodiment of the present invention.

FIG. 9 is a schematic block diagram of a matching point extracting apparatus constituting a second embodiment.

As shown in FIG. 9, the matching point extracting apparatus of the present embodiment is provided with an image input unit 101, a reference image memory 102, a search image memory 103, an address generation unit 104, a size data keeping unit 105, a pixel number calculation unit 106, a decision unit 107, an edge mask template image formation unit 121 and a template image formation unit 109, which are constructed by an electronic computer such as a microcomputer composed principally of a CPU, a ROM, a RAM, etc.

The image input unit 101 receives and processes the image data of plural images of a same object, taken from different viewing points as shown in FIGS. 1A and 1B, and may or may not include one or two cameras.

The reference image memory 102 stores, as a reference image, the image data of an arbitrarily selected one among the image data of the plural images of the same object, taken from different viewing points and entered by the image input unit 101, and the search image memory 103 stores other image data as search images.

The address generation unit 104 supplies the template image formation unit 109 with an address indicating a point of the reference image stored in the reference image memory 102, while the size data keeping unit 105 supplies the template image formation unit 109 with size data of a template image, and the template image formation unit 109 forms a template image by cutting out, from the reference image in the reference image memory 102, an area having the center indicated by the address supplied from the address generation unit 104 and having a size of the size data supplied from the size data keeping unit 105 and supplies the pixel number calculation unit 106 with such a template image.

The pixel number calculation unit 106 calculates, with respect to the template image supplied from the template image formation unit 109 or an edge mask template image, to be explained later, supplied from the edge mask template image formation unit 121 and the search image supplied from the search image memory 103, the number of pixels in the entire template image or in the entire edge mask template image showing differences in the luminance value within a predetermined threshold value ∈ with respect to each pixel in the search image according to the aforementioned function (3), namely calculating the number of pixels of the template image or the edge mask template image having differences in the luminance value within a predetermined value from each pixel of the search image, then determines a candidate matching point based on such a number of pixels, calculates the similarity of the candidate matching point and supplies the decision unit 107 with such a candidate matching point and the calculated similarity.

The decision unit 107 judges, when the template image used in the pixel number calculation unit 106 is that formed by the template image formation unit 109, whether the center point of the template image belongs to an area with a significant variation in the object distance (namely, an area with a steep variation in the parallax distribution) within such a template image, based on the similarity obtained from the pixel number calculation unit 106, and, when the center point belongs to such an area, instructs the edge mask template image formation unit 121 to form an edge mask template image which is masked outside strong edges in the template image formed by the template image formation unit 109 and to supply the pixel number calculation unit 106 with such an edge mask template image.

In response to the supply of such an edge mask template image based on such an instruction, the pixel number calculation unit 106 again calculates the similarity based on the edge mask template image and sends a candidate matching point to the decision unit 107.

When the center point of the template image does not belong to the area with a significant variation in the object distance, the decision unit 107 decides the candidate matching point, supplied from the pixel number calculation unit 106 as the matching point and outputs such a matching point.

The above-explained configurations are different from the foregoing first embodiment in the edge mask template image formation unit 121. More specifically, when the center point of the template image belongs to an area with a significant variation in the object distance, the first embodiment reduces the size of the template image, but the second embodiment divides the template along a strong edge and effects the matching with a template containing the center point.

As explained in the foregoing, the second embodiment divides the template along a strong edge and effects the matching operation with a template containing the center point, because, in the area involving a significant variation in the object distance, a strong edge appears between the main object and the background because of the difference in texture therebetween, so that the matching operation with the template divided along such a strong edge eliminates the deterioration in similarity resulting from the portions of different object distances within the template, thus improving the precision of the matching point extraction.

In the following, there will be explained the process executed in the edge mask template image formation unit 121, with reference to a flow chart shown in FIG. 10. In the present embodiment, the template is not actually divided, but is corrected by masking the outside area of the strong edge, in order not to use such an outside area in the calculation of the similarity.

The edge mask template image formation unit 121 accesses a template image from the template image formation unit 109 (step S201; cf. FIG. 11A), and forms an edge image from the template image, for example, by Zobel filtering (step S202; cf. FIG. 11B).

Then it extracts an edge image of edges, stronger than a predetermined threshold value, from the edge image formed in the step S202 (step S203; cf. FIG. 11C), then extracts, from the image of the thus extracted strong edges, edges of an area closer to the center point of the template image (step S204; cf. FIG. 11D), and masks the outside of the edges extracted in the step S204 (step S205; cf. FIG. 11E). Finally, the mask image is superposed with the template image to form an edge mask template image, which is outputted to the pixel number calculation unit 106 (step S206; cf. FIG. 11F).

The thus formed edge mask template image allows highly precise matching point extraction, thereby enabling a highly precise determination of the distribution of the object distance, though the required processing time is somewhat longer.

When the edge mask template image is employed in the present embodiment, the number of unmasked effective pixels is smaller than the number of pixels in the original template image, so that the number of pixels outputted from the pixel number calculation unit 106 has to be converted into a value of a case in which the number of effective pixels is the same as that of pixels in the original template image or has to be outputted in a ratio to the number of pixels in the original template image.

Figure 10:
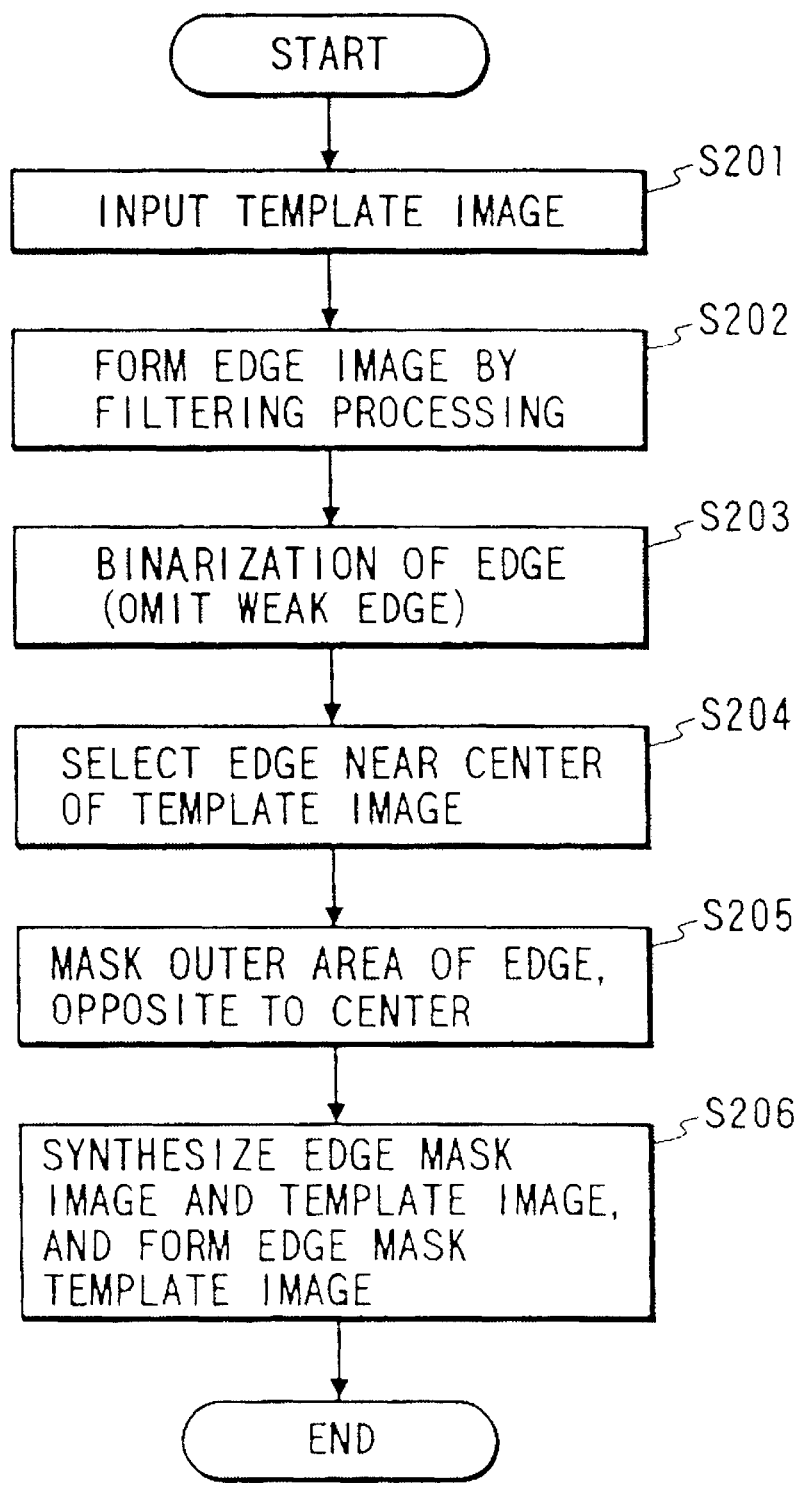
FIG. 10 is a flow chart showing the process in an edge mask template image formation unit in the second embodiment.

In the present second embodiment, the step S204 in FIG. 10 selects the edges closer to the center point of the template, but such edges are not necessarily those separating the main object and the background. For this reason, in the area with a significant variation in the object distance, it is effective to repeat the matching point extraction process by forming edge mask template images in succession, starting with the edges farther from the center point.

Figure 13:
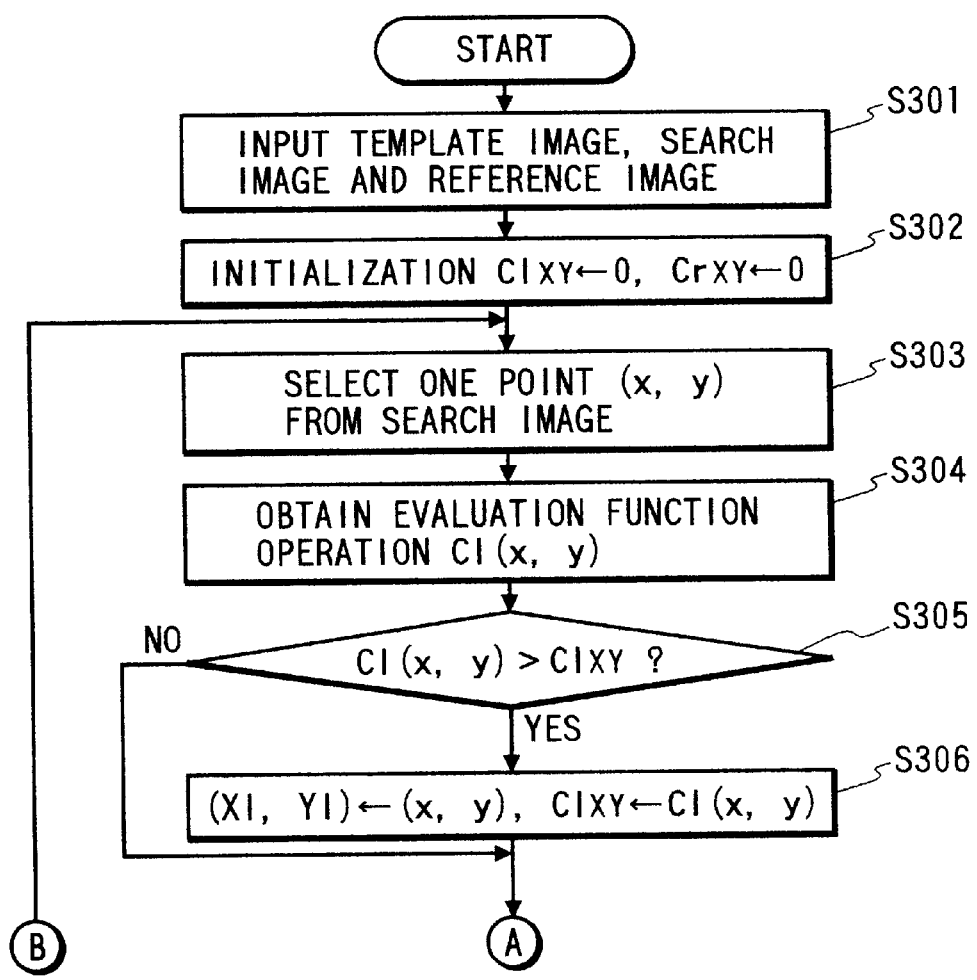
FIGS. 13 and 14 are flow charts showing the process in a pixel number calculation unit in the third embodiment.
Figure 14:
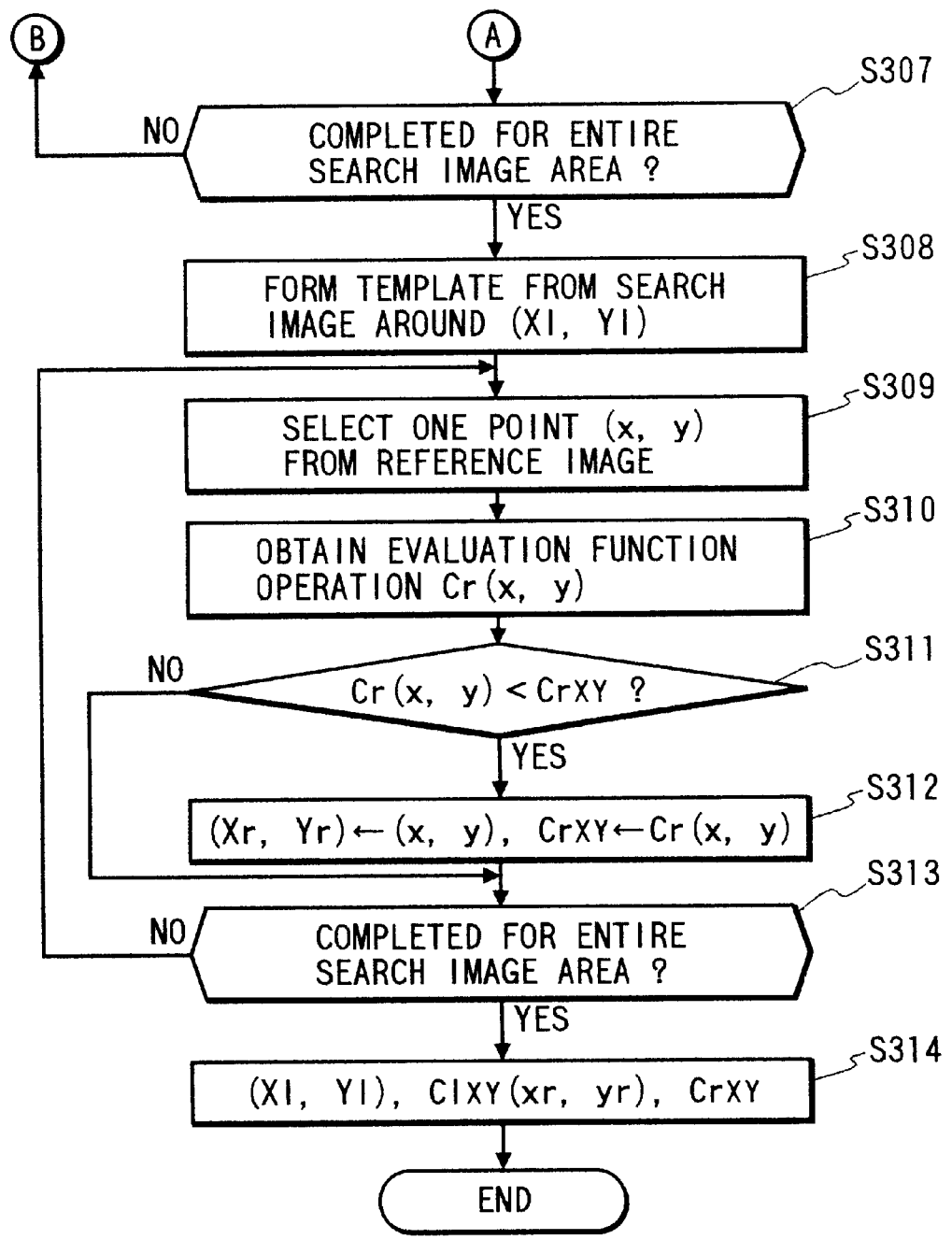

In the following, there will be explained a third embodiment of the present invention, with reference to FIGS. 12, 13 and 14.

The third embodiment identifies an area involving a significant variation in the object distance and an occlusion area. More specifically, the third embodiment employs a process of forming a template image from the reference image, then searching a candidate matching point in the search image by means of such a template image, forming a template image having the center at such a candidate matching point, then searching a candidate matching point in the reference image by means of the template image having the center at the candidate matching image, and identifying the matching point according to whether such a candidate matching image in the reference image coincides with the center point of the template image therein, and, in such a process, there is judged whether the center point of the template image belongs to an area with a significant variation in the object distance or an occlusion area, and the result of such a judgment is also considered to avoid erroneous extraction of the matching point for a point in the occlusion area which does not have any matching point, and to enable exact extraction of the matching point for other areas.

Figure 12:
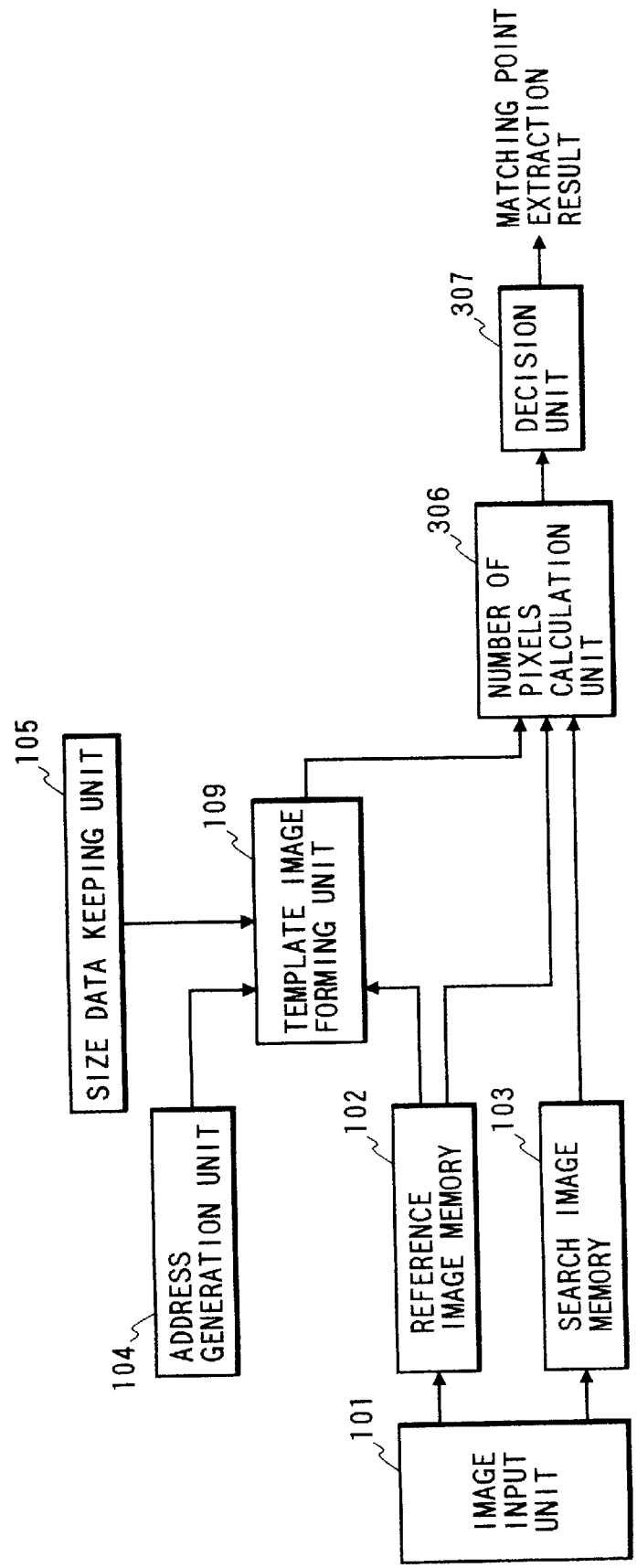
FIG. 12 is a schematic block diagram of a matching point extracting apparatus constituting a third embodiment of the present invention.

FIG. 12 is a schematic block diagram of a matching point extracting apparatus, constituting the third embodiment.

As shown in FIG. 12, the matching point extracting apparatus of the present embodiment is provided with an image input unit 101, a reference image memory 102, a search image memory 103, an address generation unit 104, a size data keeping unit 105, a pixel number calculation unit 306, a decision unit 307, and a template image formation unit 109, which are constructed by an electronic computer such as a microcomputer composed principally of a CPU, a ROM, a RAM, etc.

The image input unit 101 receives and processes the image data of plural images of a same object, taken from different viewing points as shown in FIGS. 1A and 1B, and may or may not include one or two cameras.

The reference image memory 102 stores, as a reference image, the image data of an arbitrarily selected one among the image data of the plural images of the same object, taken from different viewing points and entered by the image input unit 101, and the search image memory 103 stores other image data as search images.

The address generation unit 104 supplies the template image formation unit 109 with an address indicating a point of the reference image stored in the reference image memory 102, while the size data keeping unit 105 supplies the template image formation unit 109 with size (area) of an initial template image.

The template image formation unit 109 forms a template image by cutting out, from the reference image in the reference image memory 102, an area having the center indicated by the address supplied from the address generation unit 104 and having a size supplied from the size data keeping unit 105 and supplies the pixel number calculation unit 306 with such a template image.

The pixel number calculation unit 306 calculates, with respect to the template image supplied from the template image formation unit 109 and the search image supplied from the search image memory 103, the number of pixels in the entire template image showing differences in the luminance value within a predetermined threshold value $\epsilon$ with respect to each pixel in the search image according to the aforementioned function (3), namely calculating the number of pixels of the template image having differences in the luminance value within a predetermined value from each pixel of the search image, then determines a candidate matching point based on such a number of pixels, calculates the similarity of such a candidate matching point and supplies the decision unit 307 with such a candidate matching point and the calculated similarity.

The pixel number calculation 306 also forms, in the search image, a template having the center at the candidate matching point on the search image, then calculates, with respect to the template image and the search image, the number of pixels in such an entire template image showing differences in the luminance value within a predetermined threshold value $\epsilon$ with respect to each pixel in the reference image, then determines a candidate matching point based on such a number of pixels, calculates the similarity of such a candidate matching point and supplies the decision unit 307 with such a candidate matching point and the calculated similarity.

The decision unit 307 judges, based on the two candidate matching points and the two similarities supplies thereto, whether the point indicated by the address generation unit 104 in the reference image memory 102, namely the center point of the template image formed from the reference image, belongs to an occlusion area, and whether a candidate matching point obtained on the search image is a correct matching point, and outputs the result of such judgments as the result of matching point extraction.

In the following, there will be given a detailed explanation of the function of the pixel number calculation unit 306, with reference to flow charts in FIGS. 13 and 14, in which the coordinate of the candidate matching point on the search image is represented by (Xl, Yl), the similarity of such a point by Clxy, the coordinate of the candidate matching point on the reference image by (Xr, Yr) and the similarity of such a point by Crxy.

The pixel number calculation unit 306 at first accesses a template image, a search image and a reference image (step S301), and initializes the similarities Clxy, Crxy to "0" (step S302). It then selects a point (x, y) in the search image (step S303), then compares the luminance value of such a point with those of all the pixels in the template image, calculates the number of pixels of the template image showing differences within a predetermined threshold value $\epsilon$ and sets such a number of pixels as the similarity Cl(x, y) (step S304).

Then, it compares the similarity Cl(x, y), set in the step S304, with a current similarity Clxy (step S305), and, if the former is larger, it substitutes the coordinate (Xl, Yl) of the candidate matching point with (x, y) and also substitutes the similarity Clxy with Cl(x, y) (step S306), and the sequence proceeds to a step S307. On the other hand, if the similarity Cl(x, y) set in the step S304 does not exceed the current similarity Clxy, the sequence skips the step S306 and proceeds to the step S307.

The step S307 judges whether the process of the steps S303 to S306 has been completed for all the points in the search image, and, if not completed, the sequence returns to the step S303, but, if completed, a template image having the center at (Xl, Yl) is formed from the search image (step S308).

Then, a point (x, y) is selected from the reference image (step S309). The luminance value of such a point is compared with those of all the pixels of the template image, then there is calculated the number of pixels showing differences within a predetermined threshold value $\epsilon$ and such a number of pixels is set as the similarity Cr(x, y) (step S310).

Then, the similarity Cr(x, y) set in the step S310 is compared with a current similarity Crxy (step S311), and, if the former is larger, the coordinate (Xr, Yr) of the candidate matching point is substituted by (x, y) and the similarity Crxy is substituted by Cr(x, y) (step S312), and the sequence proceeds to a step S313. On the other hand, if the similarity Cr(x, y) set in the step S310 does not exceed the current similarity Crxy, the sequence skips the step S312 and proceeds to the step S313.

The step S313 judges whether the process of the steps S309 to S312 has been completed for all the points in the reference image, and, if not, the sequence returns to the step S309. If completed, the coordinate (Xl, Yl) of the candidate matching point on the search image, the similarity Clxy thereof, the coordinate (Xr, Yr) of the candidate matching point on the reference image and the similarity Crxy thereof are outputted to the decision unit 307 (step S314) and the sequence is terminated.

In the following, the process of the decision unit 307 will be explained in detail.

If the center point of the template image formed from the reference image coincides with the coordinate (Xr, Yr) of the candidate matching point on the reference image, and if the similarities Clxy, Crxy are both larger than the larger one of the threshold values, namely if Clxy>Chth and Crxy>Chth wherein Chth is the larger one of the threshold values, the decision unit 307 judges the candidate matching point on the search image as the matching point and outputs the coordinate (Xl, Yl) thereof.

On the other hand, if the center point of the template image formed from the reference image does not coincide with the coordinate (Xr, Yr) of the candidate matching point on the reference image, and if either or both of the similarities Clxy, Crxy are smaller than the smaller one of the threshold values, namely if Clxy<Clth or Crxy<Clth wherein Clth is the smaller one of the threshold values, the decision unit 307 judges that the center point of the template image formed from the reference image belongs to an occlusion area and does not have the matching point. In other cases, it judges that the center point of the template image formed from the reference image belongs to an area involving a significant variation in the object distance, and that it cannot be determined whether the candidate matching point (Xl, Yl) on the search image is the matching point. Such an undetermined point may be utilized in a succeeding process as a point of low reliability or may be disregarded in such a succeeding process.

Figure 15:
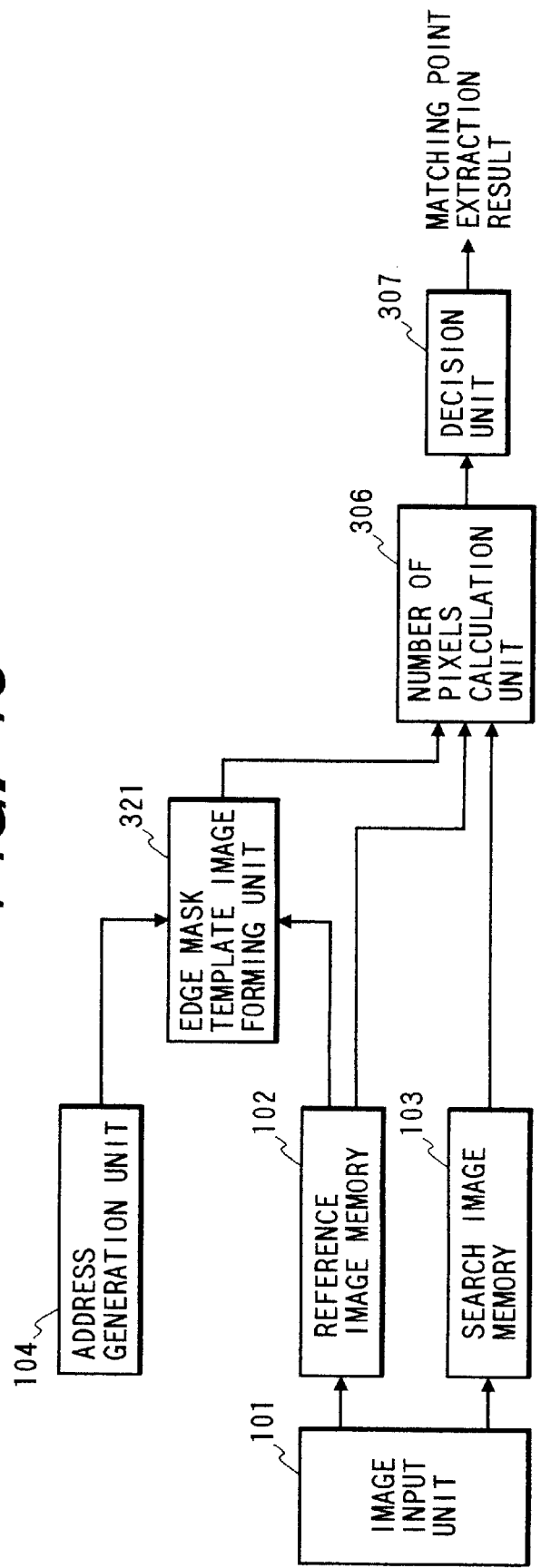
FIG. 15 is a schematic block diagram of a matching point extracting apparatus in a variation of the third embodiment of the present invention.

It is also possible to employ the edge mask template image formation unit 321 as shown in FIG. 15, instead of the template image formation unit 109, to utilize the edge mask template image explained in the second embodiment instead of the template image, thereby further improving the precision of the matching point extraction for the area with a significant variation in the object distance.

A fourth embodiment is obtained by the combination of the third and first embodiments. More specifically, it employs a process of forming a template image from the reference image, determining a candidate matching point in the search image by means of the template image, then forming a template image with the center at such a candidate matching point, determining a candidate matching point in the reference image by means of such a template image having the center at the candidate matching point and judging the matching point according to whether the candidate matching point in the reference image coincides with the center point of the template therein, and, in such a process, it also considers whether the center point of the template image belongs to an area involving a significant variation in the object distance (area with steep variation in the parallel distribution) or belongs to an occlusion area, and, when the center point of the template image belongs to the area with a significant variation in the object distance, it repeats the above-mentioned process with a size reduction in the template image, thereby preventing an erroneous matching point extraction for a point in the occlusion area, having no matching point, and also enabling a more exact extraction of the matching point for a point in other areas, particularly a point in an area with a significant variation in the object distance.

Figure 16:
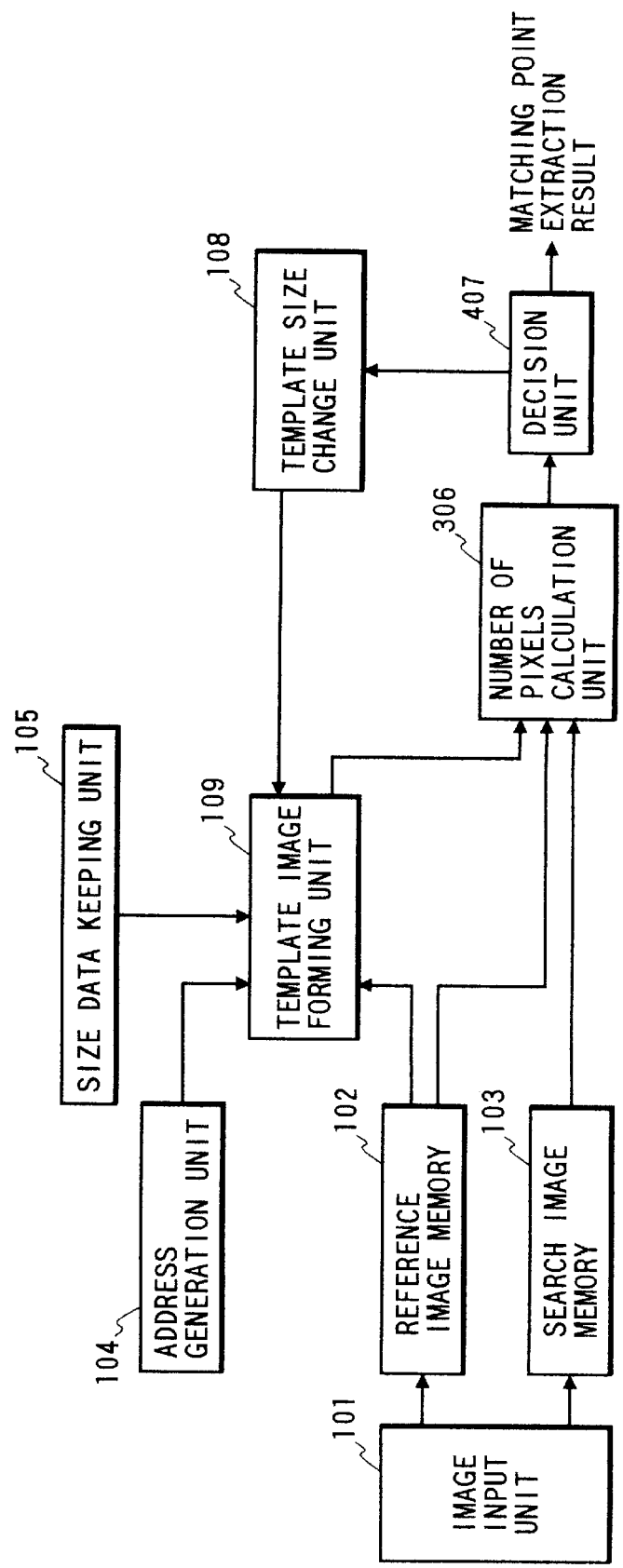
FIG. 16 is a schematic block diagram of a matching point extracting apparatus constituting a fourth embodiment of the present invention.

FIG. 16 is a schematic block diagram of a matching point extracting apparatus, constituting the fourth embodiment.

As shown in FIG. 16, the matching point extracting apparatus of the present embodiment is provided with an image input unit 101, a reference image memory 102, a search image memory 103, an address generation unit 104, a size data keeping unit 105, a pixel number calculation unit 306, a decision unit 407, a template size changing unit 108 and a template image formation unit 109, which are constructed by an electronic computer such as a microcomputer composed principally of a CPU, a ROM, a RAM, etc.

The image input unit 101 receives and processes the image data of plural images of a same object, taken from different viewing points as shown in FIGS. 1A and 1B, and may or may not include one or two cameras.

The reference image memory 102 stores, as a reference image, the image data of an arbitrarily selected one among the image data of the plural images of the same object, taken from different viewing points and entered by the image input unit 101, and the search image memory 103 stores other image data as search images.

The address generation unit 104 supplies the template image formation unit 109 with an address indicating a point of the reference image stored in the reference image memory 102, while the size data keeping unit 105 supplies the template image formation unit 109 with the size (area) of an initial template image, and the template size changing unit 108 supplies the template image formation unit 109 with changed size data of the template image, according to a changing instruction from the decision unit 407.

The template image formation unit 109 forms a template image by cutting out, from the reference image in the reference image memory 102, an area having the center indicated by the address supplied from the address generation unit 104 and having a size supplied from the size data keeping unit 105 or the template size changing unit 108 and supplies the pixel number calculation unit 306 with such a template image. The size of the data supplied from the template size changing unit 108 is smaller than the size of the data supplied from the size data keeping unit 105.

The pixel number calculation unit 306 calculates, with respect to the template image supplied from the template image formation unit 109 and the reference image or the search image supplied from the reference image memory 102 or the search image memory 103, the number of pixels in the entire template image showing differences in the luminance value within a predetermined threshold value $\epsilon$ with respect to each pixel in the search image according to the aforementioned function (3), namely calculating the number of pixels of the template image having differences in the luminance value within a predetermined value from each pixel of the search image, then determines a candidate matching point based on such a number of pixels, calculates the similarity of such a candidate matching point and supplies the decision unit 407 with such a candidate matching point and the calculated similarity.

The decision unit 407 judges, based on the two candidate matching points and the two similarities supplied thereto, when the template image is of a larger size, whether the center point of the template image belongs to an area with a significant variation in the object distance in such a template image, and, if so, it instructs the template size changing unit 108 to supply the template image formation unit 109 with the data of the template image of a smaller size.

In response to the size data of the smaller size supplied according to such an instruction, the template image formation unit 109 forms a template image corresponding to the thus supplied data of the smaller size, and, based on such a template image of the smaller size, the pixel number calculation unit 306 again calculates the similarity and determines and outputs the candidate matching point.

On the other hand, if the center point of the template image does not belong to the area with a significant variation in the object distance in the template image, the candidate matching point from the pixel number calculation 306 is determined as the matching point and is outputted.

When the template image is of a smaller size, there are judged whether the center point of the template image belongs to an occlusion area and whether the candidate matching point is reliable as the matching point, and the results of such judgments are outputted.

In the following, the process of the decision unit 407 will be explained in detail.

If the center point of the template image formed from the reference image coincides with the coordinate (Xr, Yr) of the candidate matching point on the reference image, and if the similarities Clxy, Crxy are both larger than the larger one of the threshold values, namely if Clxy>Chth and Crxy>Chth wherein Chth is the larger one of the threshold values, the decision unit 407 judges the candidate matching point on the search image as the matching point and outputs the coordinate (Xl, Yl) thereof.

On the other hand, if the center point of the template image formed from the reference image does not coincide with the coordinate (Xr, Yr) of the candidate matching point on the reference image, and if either or both of the similarities Clxy, Crxy are smaller than the smaller one of the threshold values, namely if Clxy<Clth or Crxy<Clth wherein Clth is the smaller one of the threshold values, the decision unit 407 judges that the center point of the template image formed from the reference image belongs to an occlusion area and does not have the matching point.

In other cases, it judges that the center point of the template image formed from the reference image belongs to an area involving a significant variation in the object distance, and, if the template image is of a larger size, it executes a similar judgment on the candidate matching point and the similarity obtained from the pixel number calculation unit 306, based on the template image of the smaller size in a manner as explained in the foregoing, but, if the template image is of a smaller size, it judges that it cannot determine whether the candidate matching point (X1, Y1) on the search image is the matching point for the center point of the template image formed from the reference image.

The foregoing judgments in different cases are summarized in FIGS. 17A to 17D. FIG. 17A shows a case with the larger sized template image where the center point of the template image formed from the reference image coincides with the coordinate (Xr, Yr) of the candidate matching point; FIG. 17B shows a case with the larger sized template image where the center point of the template image formed from the reference image does not coincide with the coordinate (Xr, Yr) of the candidate matching point; FIG. 17C shows a case with the smaller sized template image where the center point of the template image formed from the reference image coincides with the coordinate (Xr, Yr) of the candidate matching point; and FIG. 17D shows a case with the smaller sized template image where the center point of the template image formed from the reference image does not coincide with the coordinate (Xr, Yr) of the candidate matching point. Also, in FIGS. 17A to 17D, "match" means the determination of the matching point; "large" means the identification of an occlusion area; "small" means the repetition of the evaluation function operation with the reduction of the template size; and "non" means that the matching point is not identified.

In the fourth embodiment, the matching point extraction with the smaller sized template image may result in a case where the candidate matching point cannot be determined as the matching point, as indicated in FIGS. 17C and 17D. In such a case, it is also possible to repeat a similar process plural times by further reducing the size of the template image. Also, in the fourth embodiment, as in the third embodiment, it is possible to employ the edge mask template image explained in the second embodiment instead of the template image, thereby further improving the accuracy of the matching point extraction in the area involving a significant variation in the object distance.

The present invention is not limited to the foregoing first to fourth embodiments, but is likewise applicable also to the moving area of a moving object, since, in such a case, the parallax distribution varies steeply by the moving parallax. Also, the pixel value can be a color signal value such as red, green or blue, instead of the luminance.

In addition, according to the above-described embodiments of the present invention, the precision of the extraction of an image matching point in the template matching method can be improved.

Figure 18:
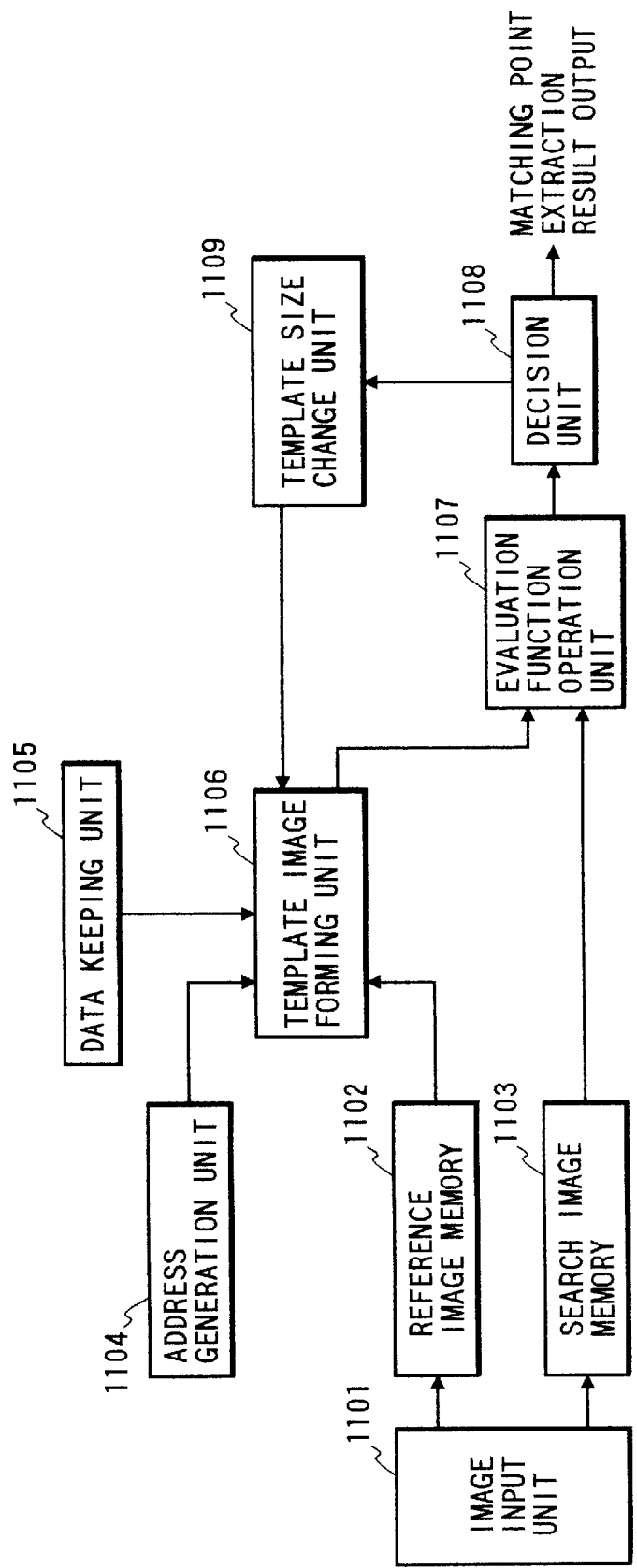
FIG. 18 is a schematic block diagram of a matching point extracting apparatus constituting a fifth embodiment of the present invention.

In the following, there will be explained a fifth embodiment of the present invention, with reference to FIGS. 18 to 21B. FIG. 18 is a schematic block diagram of a matching point extracting apparatus constituting the fifth embodiment, wherein shown are image input means 1101 provided, for example, with two cameras as shown in FIG. 1A; a reference image memory 1102; a search image memory 1103; an address generation unit 1104; a data keeping unit 1105; a template image formation unit 1106; an evaluation function operation unit 1107; a decision unit 1108; and a template size changing unit 1109.

Referring to FIG. 18, images are entered from the image input means 1101 and are respectively stored in the reference image memory 1102 and the search image memory 1103. The address generation unit 1104 sends an address indicating a point in the reference image memory 1102 while the data keeping unit 1105 sends an initial template size, to the template image formation unit 1106, which in response forms a template image having the center at a point indicated by the address of the reference image memory 1102 and having a size of the above-mentioned template size. The evaluation function operation unit 1107 calculates the evaluation value on the template image entered from the template image formation unit 1106 and the search image entered from the search image memory 1103, utilizing one of the similarity evaluating functions (1) to (3) explained in the foregoing, and outputs the candidate matching point and the evaluation value thereof. In the case of a larger template, the decision unit 1108 judges, based on the obtained evaluation value, whether the center point of the template belongs to an area involving a significant variation in the object distance, and, if so, it sends a signal to the template size changing unit 1109 which in response sends a new template size to the template image formation unit 1106. Utilizing a new template formed therein, the evaluation function operation unit 1107 again calculates the evaluation value and determines the matching point. On the other hand, if the center point of the template does not belong to the area involving a significant variation in the distance, the obtained matching point is outputted.

In the above-explained configuration, the address generation unit 1104 executes an operation of generating an address indicating a point in the reference image memory 1102, and the data keeping unit 1105 executes an operation of storing the data of the template size of the first template matching and sending such data to the template image formation unit 1106. The template image formation unit 1106 executes an operation of receiving the address from the address generation unit 1104, the template size data from the data keeping unit 1105 or the template size from the template size changing unit 1109 and the reference image from the reference image memory 1102, and forming the template image. The evaluation function operation unit 1107 executes an operation of calculating the evaluation value on the template image and the search image, based on one of the foregoing functions (1) to (3), and outputting the candidate matching point and the evaluation value thereof.

Now the function of the evaluation function operation unit 1107 will be explained with reference to a flow chart in FIG. 19, which employs the correlation value $\sigma(x, y)$ of the aforementioned function (2) as the evaluation function.

In the following description, the coordinate of the candidate matching point is represented by $(X, Y)$, and the correlation value is represented by $\sigma(x, y)$.

In FIG. 19, a step S1201 enters a template image and a search image, and a step S1202 initializes the evaluation value ($\sigma(x, y)=0$). A next step S1203 selects a point from the search image, matches the selected point with the center of the template, and a next step S1204 calculates the evaluation value. A step S1205 judges whether the evaluation value calculated in the step S1204 is higher than the evaluation value obtained before, and, if higher, a next step S1206 retains the coordinate as a candidate matching point, also substitutes the evaluation value obtained before, and the sequence proceeds to a next step S1207. On the other hand, if the step S1205 judges that the calculated evaluation value is lower than the evaluation value obtained before, the sequence skips the step S1206 and proceeds to the step S1207.

The step S1207 judges whether the process has been completed for all the points in the search image, and, if completed, a next step S1208 outputs the coordinate $(X, Y)$ of the candidate matching point and the evaluation value $\sigma(x, y)$ thereof, retained at this point, and the sequence is terminated. On the other hand, if the step S1207 judges that the process has not been completed for all the points, the sequence returns to the step S1203 to select a next point from the search image and to again effect the calculation of the evaluation value.

The evaluation function operation unit 1107 functions in the above-explained manner.

The decision unit 1108 executes, if the template is of a size for the first matching, an operation of judging, based on the obtained evaluation value, whether the center point of the template belongs to an area with a significant variation in the distance, but, if the template is of a size for the second matching, an operation of outputting the candidate matching point as the matching point. The judgment in the decision unit 1108 whether the center point of the template belongs to the area with a significant variation in the distance is achieved by a judgment whether the evaluation value is higher or not than a predetermined threshold value $\sigma th$. More specifically, for example, in the case of forming a template 2031 around a point P in FIG. 20A and searching a matching point in the image shown in FIG. 20B, the evaluation values, for example, on a line L can be plotted as shown in FIG. 21A. The evaluation value is based on a of the function (2). As the point P does not belong to the area with a significant variation in the distance, there can be obtained a high peak in the evaluation value $\sigma$ as shown in FIG. 21A, so that the matching point can be determined.

Figure 20A:
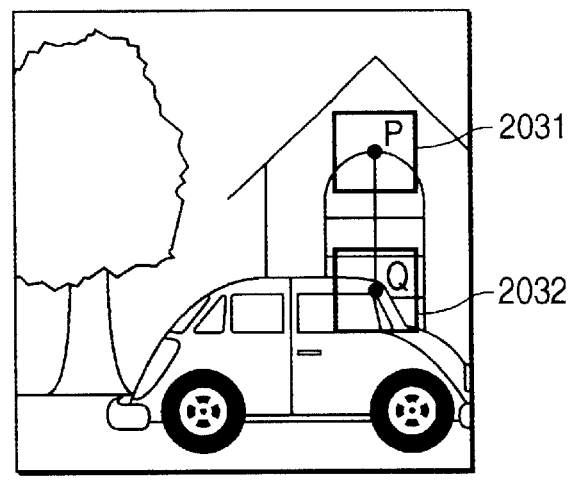
FIGS. 20A, 20B and 20C are views showing templates in an area with a constant distance and an area with a significantly varying distance, in the above-mentioned apparatus.
Figure 20B:
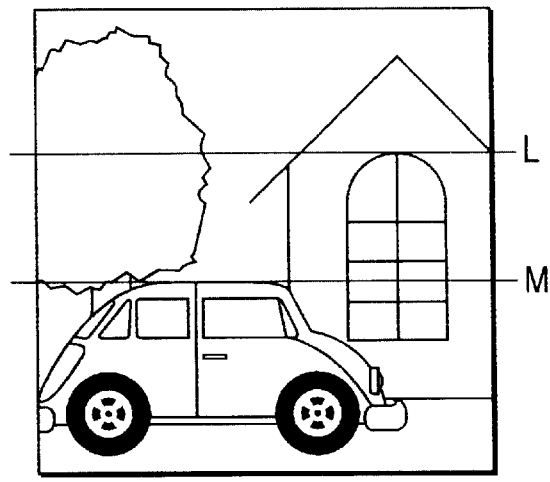
Figure 20C:
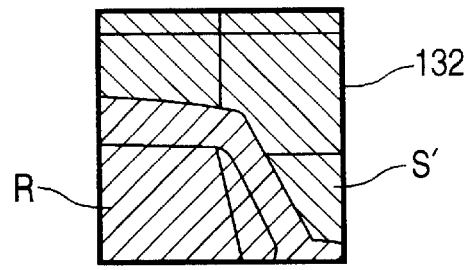
Figure 21A:
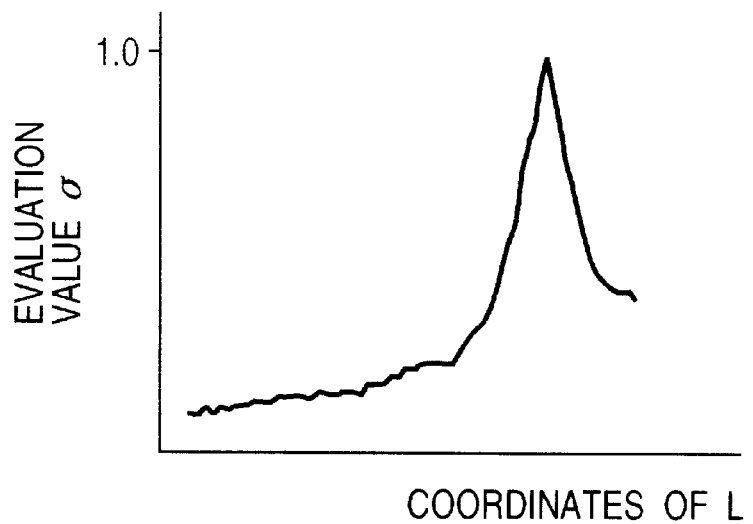
FIGS. 21A and 21B are charts showing evaluation values in the area with a constant distance and in the area with a significantly varying distance, in the above-mentioned apparatus.
Figure 21B:
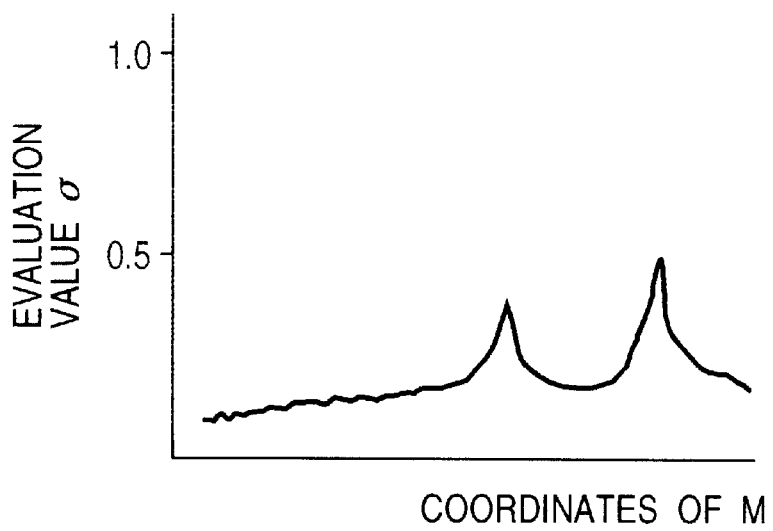

On the other hand, in the case of forming a template 2032 around a point Q in FIG. 20A and searching a matching point in the image shown in FIG. 20B, the evaluation values, for example, on a line M assume a form as shown in FIG. 21B. This is because the template contains an area involving a significant variation in the distance, and the left-side peak is caused by an increase in the evaluation value in an area R in the template as shown in FIG. 20C while the right-side peak is caused by an increase in the evaluation value in an area S. The evaluation value, based on a, of the candidate matching point for a point present in such an area with a significant variation in the distance becomes considerably lower than that for a point in other areas. Based on these facts, the judgment whether the center point of the template belongs to an area with a significant variation in the distance can be achieved according to whether the evaluation value is higher or lower than a certain threshold value a th. The center point belongs to such an area, when the function (1) is used for calculating the evaluation value, if the evaluation value $E(x, y)$ is higher than the threshold value $\sigma th$, then in the case of the function (2) if the evaluation value $\sigma(x, y)$ is lower than the threshold value $\sigma th$, and in the case of the function (3) if the evaluation value $C(x, y)$ is lower than the threshold value $Cth$.

The template size changing unit 1109 executes, when the decision unit 1108 judges that the center point of the template belongs to the area with a significant variation in the distance, an operation of reducing the template size for supply to the template image formation unit 1106.

The configuration shown in FIG. 18, consisting of the various units performing the operations explained in the foregoing, enables highly precise extraction of the matching point, thereby providing the ability to determine a highly precise distance distribution of the object.

The present embodiment employs two templates of larger and smaller sizes, but the templates may be employed in a larger number, for example, for further size reduction when the matching point is still difficult to identify with the smaller-sized template.

In the following, there will be explained a sixth embodiment of the present invention, with reference to FIGS. 22 to 24F.

Figure 22:
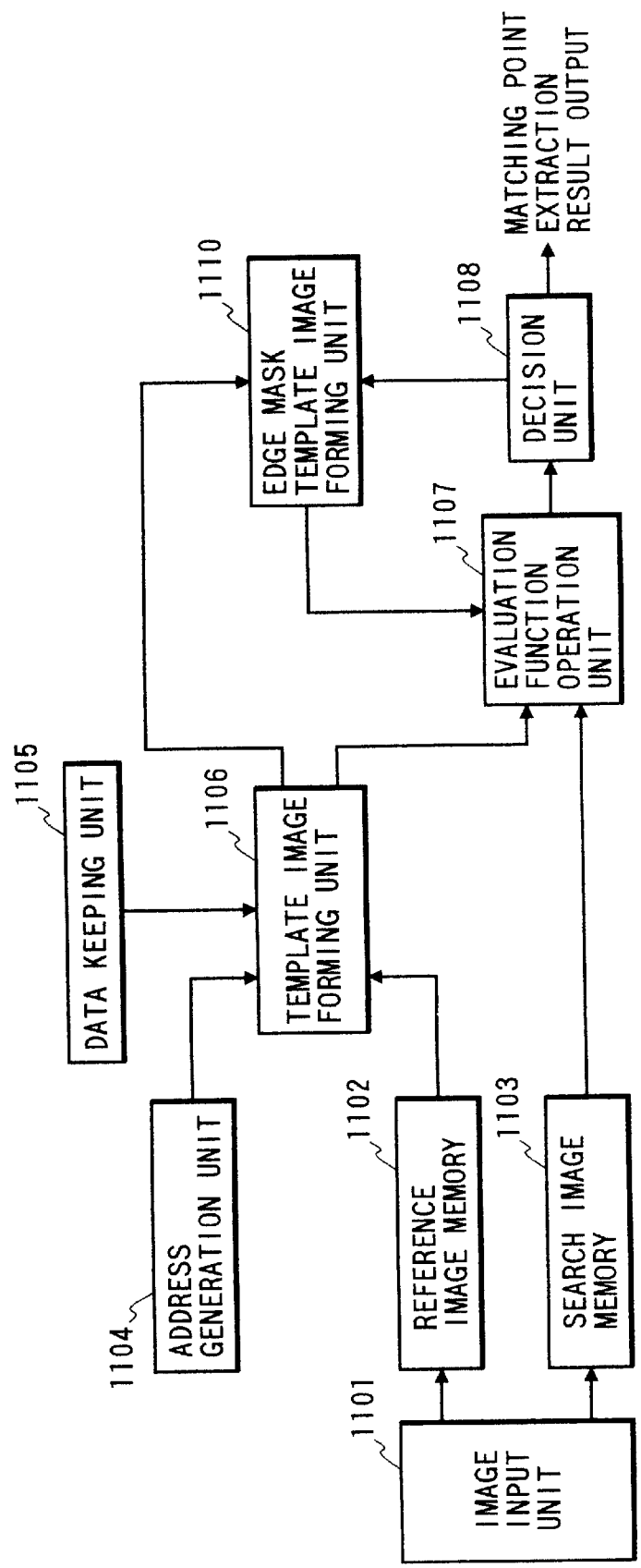
FIG. 22 is a schematic block diagram of a matching point extracting apparatus constituting a sixth embodiment of the present invention.
Figure 24D:
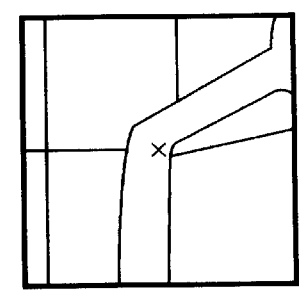
FIGS. 24A, 24B, 24C, 24D, 24E and 24F are views showing an example of the formation of an edge mask template image in the above-mentioned apparatus.
Figure 24C:
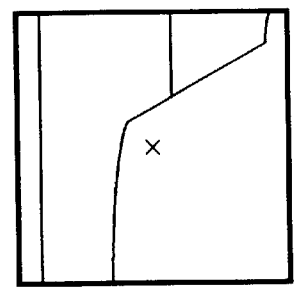
Figure 24B:
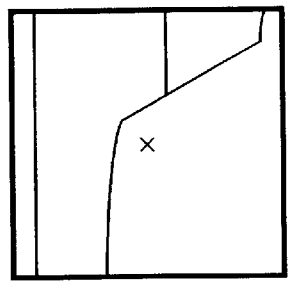
Figure 24A:
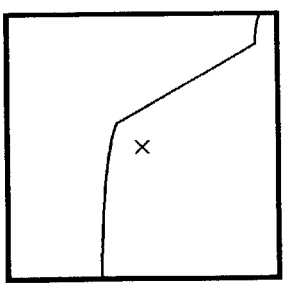
Figure 24F:
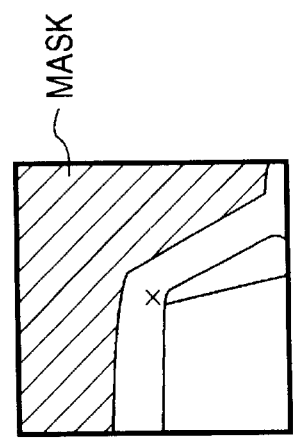
Figure 24E:
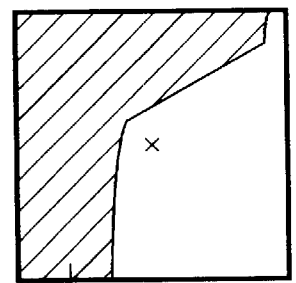

FIG. 22 is a block diagram of a matching point extracting apparatus constituting the sixth embodiment, wherein components the same as those in the fifth embodiment shown in FIG. 18 are represented by the same numbers. The configuration shown in FIG. 22 is different from that in FIG. 18 in that the template size changing unit 1109 is replaced by an edge mask template formation unit 1110.

Referring to FIG. 22, as in the fifth embodiment, images are entered from the image input means 1101 and are respectively stored in the reference image memory 1102 and the search image memory 1103. The address generation unit 1104 sends an address indicating a point in the reference image memory 1102 while the data keeping unit 1105 sends an initial template size, to the template image formation unit 1106, which in response forms a template image having the center at a point indicated by the address of the reference image memory 1102 and having a size of the above-mentioned template size. The evaluation function operation unit 1107 calculates the evaluation value on the template image entered from the template image formation unit 1106 and the search image entered from the search image memory 1103, utilizing one of the similarity evaluating functions (1) to (3) explained in the foregoing, and outputs the candidate matching point and the evaluation value thereof. In the case of a larger template, the decision unit 1108 judges, based on the obtained evaluation value, whether the center point of the template belongs to an area involving a significant variation in the object distance, and, if so, it sends a signal to the edge mask template formation unit 1110 to change the template image by masking the outside area of the strong edges. Utilizing a new template image, the evaluation function operation unit 1107 again calculates the evaluation value and determines the matching point. On the other hand, if the center point of the template does not belong to the area involving a significant variation in the distance, the obtained matching point is outputted.

The above-explained configuration is different from that of the fifth embodiment in the edge mask template formation unit 1110. If the center point of the template belongs to an area with a significant variation in the distance, the fifth embodiment reduces the template size, but the present embodiment divides the template along the strong edges and executes the matching operation with a template containing the center point. This is based on a fact that an area involving a significant variation in the distance has a different texture and therefore shows strong edges, so that the division of the template provides the ability to eliminate the influence of a portion of a different distance in the template.

In the following, there will be explained the function of the edge mask template formation unit 1110, with reference to a flow chart shown in FIG. 23. The present embodiment does not effect the actual division of the template, but forms a masked part in the template, in order not to be used for the calculation of the evaluation value.

Referring to FIG. 23, a step S1601 enters a template image, and a step S1602 forms an edge image of the template image, for example, by Zobel filtering. A next step S1603 extracts, among the edges formed on the step S1602, edges stronger than a predetermined threshold value. A step S1604 extracts, from the image of the strong edges formed in the step S1603, those close to the center point of the template. A next step S1605 masks the outside of such edges, with respect to the center of the template. A next step S1606 superposes the masked image obtained in the step S1605 and the template image to obtain an edge mask template image, and the sequence is terminated.

FIGS. 24A to 24F schematically illustrate the above-explained process and respectively show a template image, an edge image, a strong edge image, a closer edge image, a mask image and an edge mask template image.

Such an edge mask template image enables highly precise matching point extraction, thus providing the ability to determine a highly precise distance distribution of the object, though the processing time is somewhat longer.

The present embodiment selects the edges closer to the center point of the template, but such edges are not necessarily those separating the main object and the background. For this reason, it is effective to repeat the matching point extraction process by forming edge mask template images in succession, starting with the edges farther from the center point.

In the following, there will be explained a seventh embodiment of the present invention, with reference to FIG. 25, which is a flow chart showing the process of an evaluation function operation unit in a matching point extracting apparatus of the seventh embodiment.

In the foregoing fifth and sixth embodiments, if the center point of the template belongs to an area with a significant variation in the distance, the template matching operation is again executed for the entire search image either with a reduced template size or with an edge mask template image. However, such a template matching with a smaller template image or an edge mask template image may result in matching with another similar portion, thus leading to erroneous matching or to a longer processing time.

Thus, the present embodiment, utilizing the result of the initial template matching, executes the second or subsequent calculation of the evaluation value only for points where the initial evaluation value is higher than a predetermined threshold value.

Figure 25:
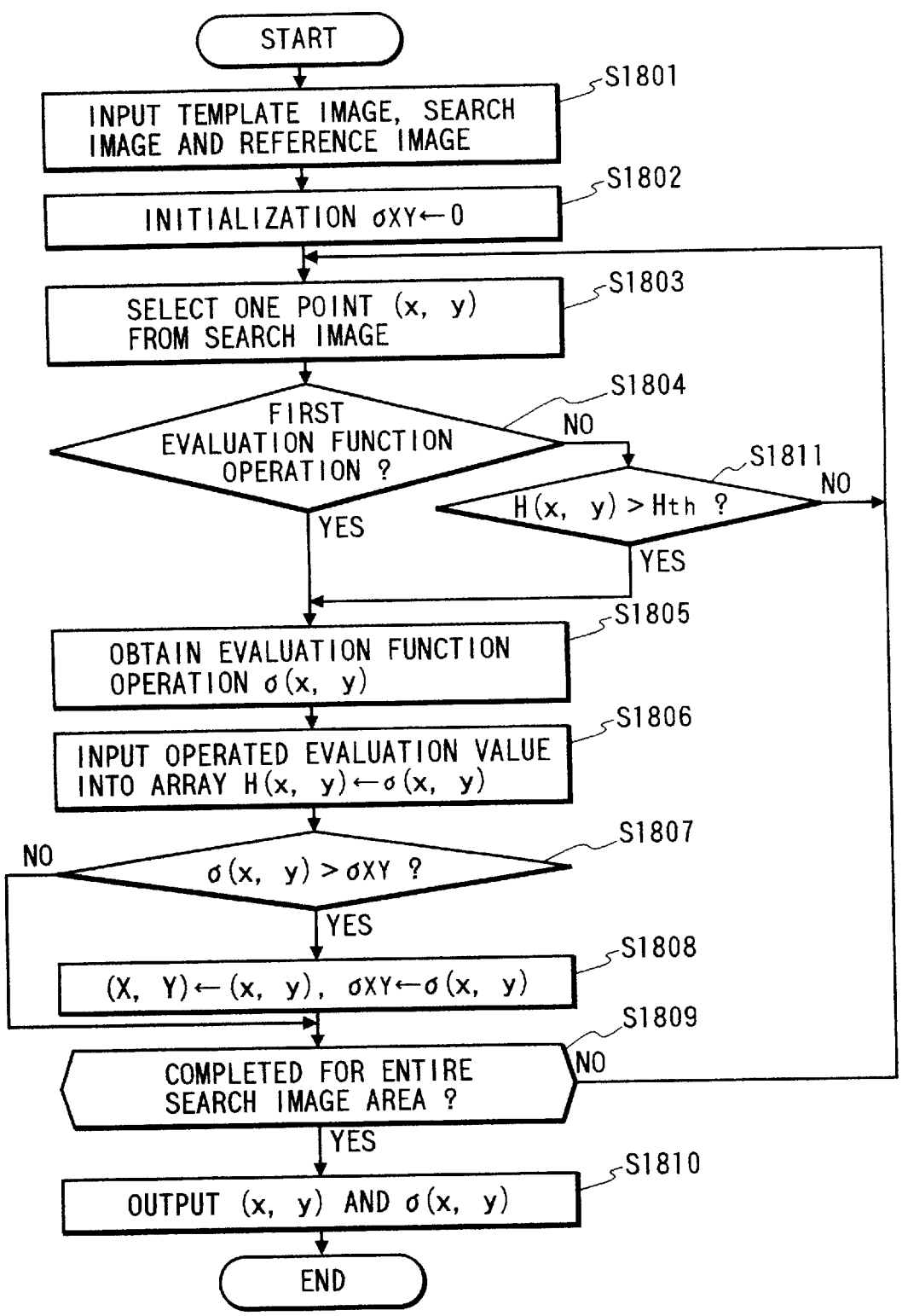
FIG. 25 is a flow chart showing the process of an evaluation function operation unit in a matching point extracting apparatus constituting a seventh embodiment of the present invention.

In the flow chart shown in FIG. 25, the evaluation value is calculated by the correlation value $\sigma(x, y)$ of the aforementioned function (2). Also, the coordinate of the candidate matching point is represented by (X Y), the evaluation value of such a point by $\sigma(x, y)$, an arrangement retaining the first evaluation values by $H(x, y)$, and a threshold value for judging whether the evaluation value is to be calculated with the edge mask template image after the change of the template size is represented by Hth.

Referring to FIG. 25, a step S1801 enters a template image and a search image, and a step S1802 initializes the evaluation value ($\sigma(x, y)=0$). Then, a step S1803 selects a point from the search image, and a step S1804 judges whether the operation with the evaluation function at this point is the first time. If it is the first time, the sequence proceeds to a step S1805, but, if not, a step S1811 judges whether the evaluation value $H(x, y)$ of this point is higher (better) than the threshold value Hth (higher is better in this case because the correlation value is employed), and, if lower (worse), the sequence returns to the step S1803 to select a next point from the search image, but, if higher (better), the sequence proceeds to the step S1805.

The step S1805 calculates the evaluation value, and a next step S1806 writes the evaluation value ($\sigma(x, y)$ in this case), calculated in the step S1805, in $H(x, y)$. Then, a step S1807 judges whether the evaluation value calculated in the step S1805 is higher than the evaluation value obtained before, and, if higher, a step S1808 retains the coordinate as a candidate matching point, substitutes the evaluation value obtained before ($\sigma(x, y)$) and the sequence proceeds to a step S1809. On the other hand, if the step S1807 judges that the calculated evaluation value is lower, the sequence proceeds to the step S1809, skipping the step S1808.

The step S1809 judges whether the process has been completed for all the points in the search image, and, if completed, a next step S1810 outputs the coordinate (X, Y) of the candidate matching point and the evaluation value ($\sigma(x, y)$), retained at this point, and the sequence is terminated. On the other hand, if the step S1809 judges that the process is not yet completed, the sequence returns to the step S1803 to select another point from the search image and to again execute the calculation of the evaluation value.

As explained in the foregoing, the present embodiment executes the calculation of the evaluation value, for example, for a different size, after judging whether such a calculation is unavoidable, based on the evaluation value obtained before. Consequently, in comparison with the foregoing fifth and sixth embodiments, it reduces the time required for the matching point extraction and also reduces the erroneous extractions, thereby improving the accuracy of matching point extraction and allowing a highly precise determination of the distance distribution of the object.

In the following, there will be explained an eighth embodiment of the present invention, with reference to FIGS. 26 to 28.

The foregoing fifth to seventh embodiments repeat the operation with the evaluation function, for example, executing a change in the template size when the center point of the template is judged to belong to an area involving significant variation in the distance. However, such a method, involving plural movements of the template over the entire search image, requires a long processing time.

Figure 28:
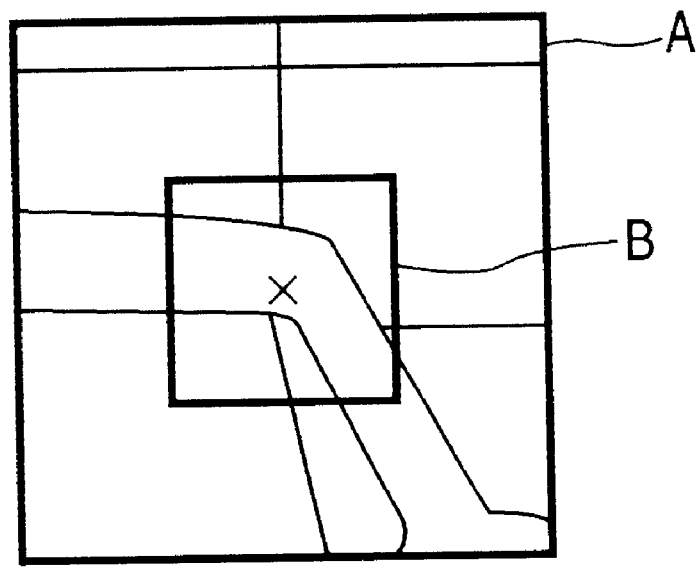
FIG. 28 is a view showing a template in the above-mentioned apparatus.

In the present embodiment, therefore, the template is divided into templates A and B as shown in FIG. 28, which are used for determining the evaluation values in respective areas, and the evaluation value to be used in each point is judged from the evaluation value of either area.

Figure 26:
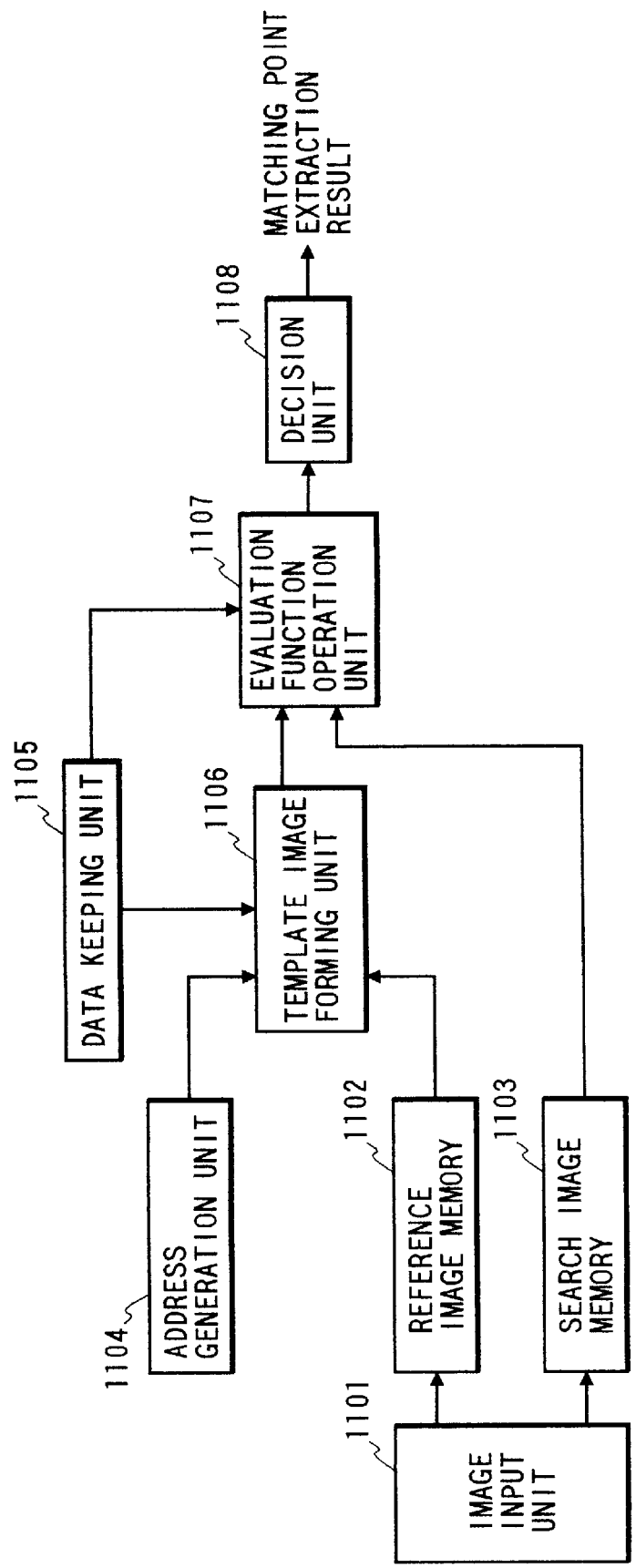
FIG. 26 is a schematic block diagram of a matching point extracting apparatus constituting an eighth embodiment of the present invention.

FIG. 26 is a block diagram of a matching point extracting apparatus constituting the present embodiment, wherein components the same as those in the fifth embodiment shown in FIG. 18 are represented by the same numbers. The configuration shown in FIG. 26 is different from that in FIG. 18 in that the template size changing unit 1109 is deleted.

Referring to FIG. 26, images are entered from the image input means 1101 and are respectively stored in the reference image memory 1102 and the search image memory 1103. The address generation unit 1104 sends an address indicating a point in the reference image memory 1102 while the data keeping unit 1105 sends an initial template size, to the template image formation unit 1106, which in response forms a template image having the center at a point indicated by the address of the reference image memory 1102 and having a size of the above-mentioned template size. The evaluation function operation unit 1107 calculates the evaluation value on the template image entered from the template image formation unit 1106 and the search image entered from the search image memory 1103, utilizing one of the similarity evaluating functions (1) to (3) explained in the foregoing, and outputs the candidate matching point and the evaluation value thereof. At the same time a smaller template size is entered from the data keeping unit 1105 to calculate the evaluation value within such a template size, and there are outputted the candidate matching point and the evaluation value thereof. The decision unit 1108 judges, based on the evaluation value obtained with the template A, whether the center point of the template belongs to an area with a significant variation in the distance, and, if so, the candidate matching point obtained with the template B is outputted as the matching point. Also, if the center point of the template does not belong to the area with a significant variation in the distance, the candidate matching point obtained with the template A is outputted as the matching point.

Figure 27:
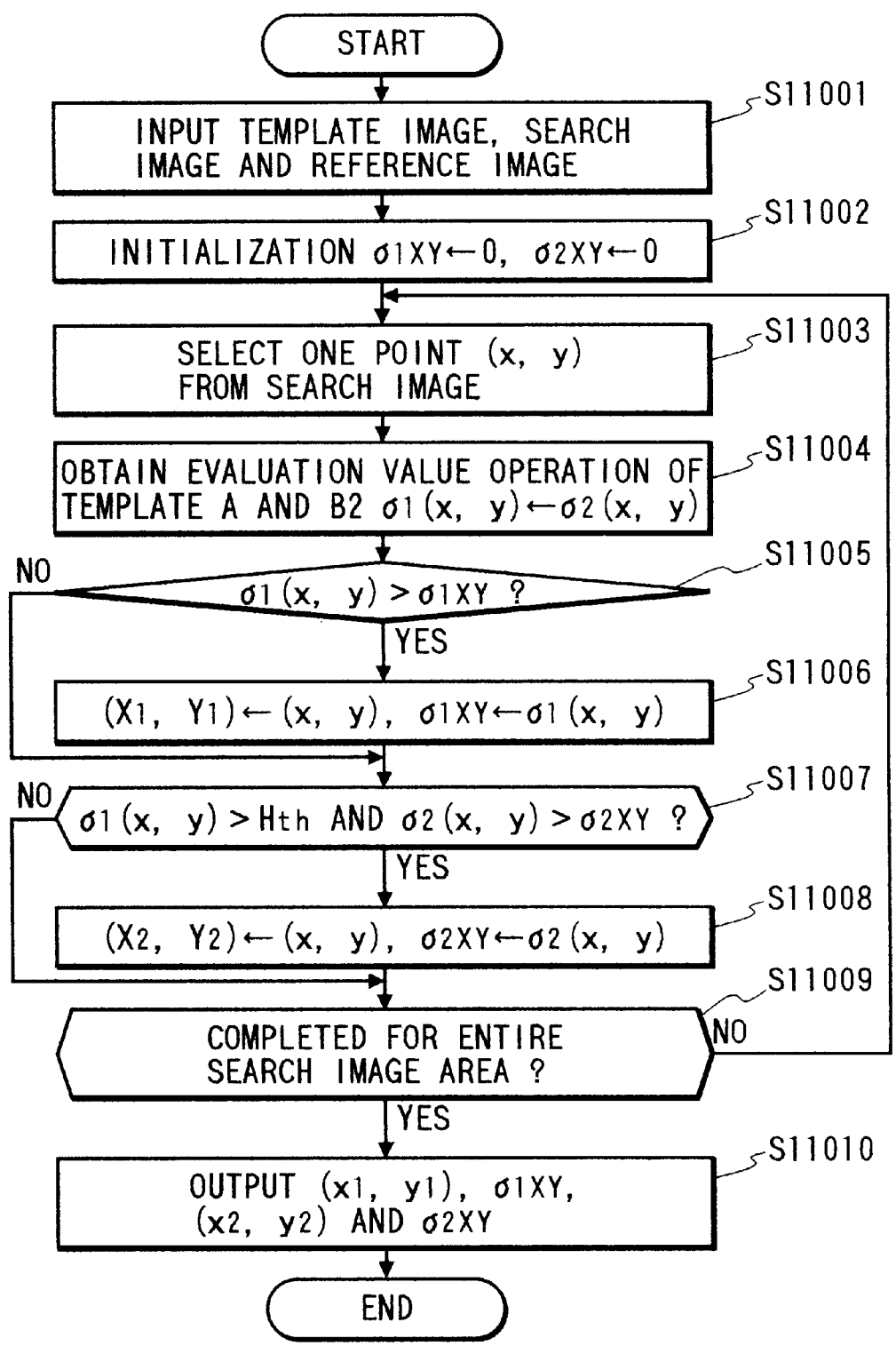
FIG. 27 is a flow chart showing the process of an evaluation function operation unit in the above-mentioned apparatus.

FIG. 27 is a flow chart showing the process of the evaluation function operation unit 1107 in the matching point extracting apparatus of the present embodiment.

In the flow chart shown in FIG. 27, the evaluation value is calculated by the correlation value σ(x, y) of the aforementioned function (2). Also, the coordinate of the candidate matching point of the template A is represented by (X1, Y1), the evaluation value of such a point by σ1(x, y), the coordinate of the candidate matching point of the template B by (X2, Y2), the evaluation value of such a point by σ2(x, y), and a threshold value for judging whether the evaluation value with the template A is valid or not is represented by Hth.

Referring to FIG. 27, a step S11001 enters a template image and a search image, and a step S11002 initializes the evaluation values (σ1(x, y)=σ2(x, y)=0). Then, a step S11003 selects a point from the search image, and a step S11004 calculates the evaluation values simultaneously with the templates A and B.

The evaluation values with the templates A and B are obtained respectively with the following functions (4) and (5):

$$\sigma_1(x, y) = \frac{\sum_{i \in A} \sum_{j \in A} \{F(i, j) \cdot A(i-x, j-y)\}}{\sqrt{\sum_{i \in A} \sum_{j \in A} F^2(i, j)} \cdot \sqrt{\sum_{i \in A} \sum_{j \in A} A^2(i, j)}} \quad (4)$$

$$\sigma_2(x, y) = \frac{\sum_{i \in B} \sum_{j \in B} \{F(i, j) \cdot A(i-x, j-y)\}}{\sqrt{\sum_{i \in B} \sum_{j \in B} F^2(i, j)} \cdot \sqrt{\sum_{i \in B} \sum_{j \in B} A^2(i, j)}} \quad (5)$$

As will be apparent from FIG. 28, the template B is smaller than the template A and is included therein, so that the evaluation value σ2(x, y) with the template B can be simultaneously obtained at the calculation for determining the evaluation value σ1(x, y) with the template A.

A next step S11005 judges whether the evaluation value with the template A (σ1(x, y) in this case) obtained in the step S11004 is higher than the evaluation value obtained before (σ1(X, Y)), and, if higher, a next step S11006 retains the coordinate as a candidate matching point for the template A and substitutes the evaluation value obtained before, and the sequence proceeds to a step S11007. On the other hand, if the step S11005 judges that the calculated evaluation value is lower than that obtained before, the sequence proceeds to the step S11007, skipping the step S11006.

The step S11007 judges whether the evaluation value with the template A, calculated in the step S11004, is higher than the threshold value Hth and the evaluation value with the template B (σ2(x, y)) is higher than the evaluation value obtained before. If the evaluation value with the template A is higher than the threshold value Hth and the evaluation value (σ2(x, y)) with the template B is higher than the evaluation value obtained before, a next step S11008 retains the coordinate as a candidate matching point for the template B, also substitutes the evaluation value obtained before, and the sequence proceeds to a next step S11009. On the other hand, if the step S11007 judges that the evaluation value with the template A is not higher than the threshold value Hth or the evaluation value (σ2(x, y)) with the template B is not higher than the evaluation value obtained before, the sequence proceeds to the step S11009, skipping the step S11008.

The step S11009 judges whether the process has been completed for all the points in the search image, and, if completed, a next step S11010 outputs the coordinates (X1, Y1), (X2, Y2) of the candidate matching points and the evaluation value σ1(x, y) retained at this point, and the sequence is terminated. On the other hand, if the step S11009 judges that the process is not yet complete, the sequence returns to the step S11003 to select a next point in the search image and to again execute the calculation of the evaluation value.

Then, the decision unit 1108 judges, utilizing the evaluation value $\sigma1(x, y)$ of the template A, calculated by the evaluation function operation unit 1107, whether the center point of the template belongs to an area with a significant variation in the distance, and, if so, outputs the coordinate (X2, Y2) of the candidate matching point obtained with the template B as the matching point, but, if the center point does not belong to such an area, outputs the coordinate (X1, Y1) of the candidate matching point obtained with the template A as the matching point.

As explained in the foregoing, the present embodiment forms a smaller area in the template, executes the calculation of the evaluation value in a similar manner also in such a smaller area, and employs the result of the calculation of the evaluation value in the smaller area of the template when the center point of the template belongs to the area involving a significant variation in the distance, whereby the accuracy of the matching point extraction can be improved without any significant increase in the processing time for the matching point extraction, in comparison with the conventional method. Consequently, there can thus be achieved a highly precise determination of the distance distribution of the object.

In the present embodiment, the template is provided therein with a small area, but it is also possible to provide any number of such small areas. Also, a similar effect as in the sixth embodiment can be obtained by simultaneously calculating the evaluation value with the edge mask as in the sixth embodiment.

In the following, there will be explained a ninth embodiment of the present invention, with reference to FIGS. 29 to 32. The images obtained as shown in FIGS. 1A and 1B contain a so-called occlusion area that has no matching point, and such an occlusion area has been difficult to identify in the prior art.

Figure 4A:
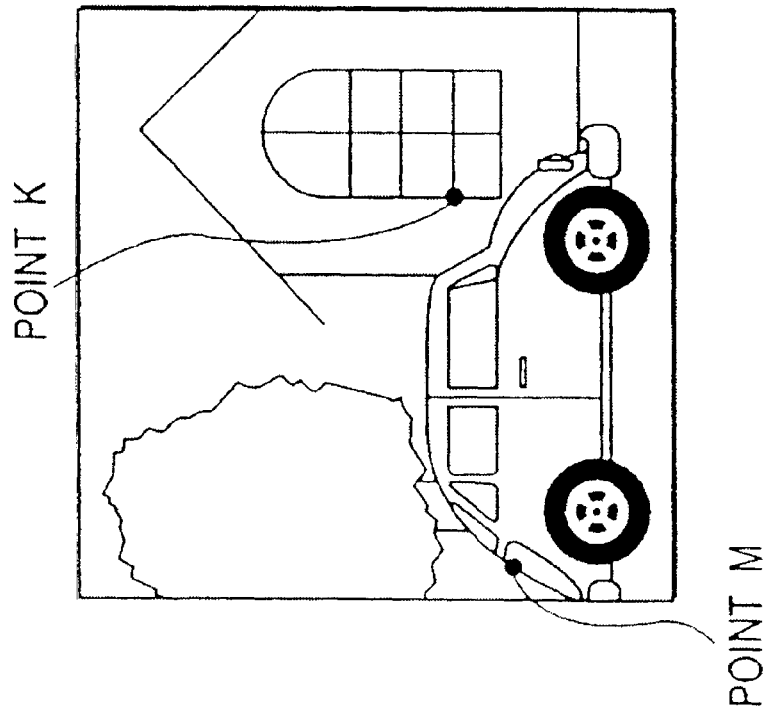
FIGS. 4A and 4B are schematic views showing another drawback in the prior art.
Figure 4B:
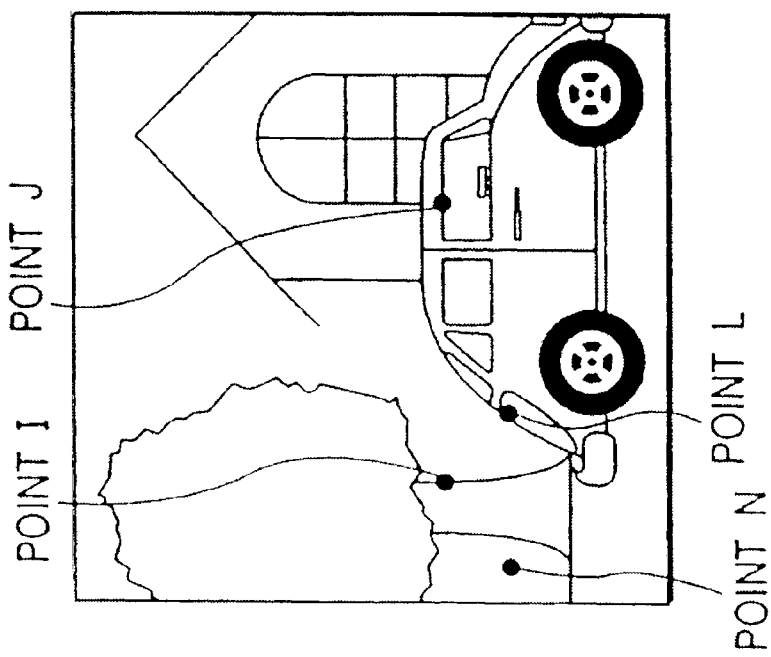

As an example, the matching point for a point I in the image shown in FIG. 4A is hidden by the car in the image shown in FIG. 4B and does not exist, therefore, in this image. Such an area is called an occlusion area, and does not contain the matching point, so that the result of the evaluation on the point in such an area should not be used for the matching point extraction. For identifying such an occlusion area, there is known a method of at first searching, on the search image, a candidate matching point for a certain point (center point of the template image) of the reference image, then preparing a template around the thus obtained candidate matching point in the search image, and searching a candidate matching point on the reference image, utilizing the thus prepared template. If the candidate matching point searched in the reference image coincides with the center point of the initially prepared template, the candidate matching point in the search image is identified as the matching point for the center point of the initially prepared template image, but, in the case of absence of coincidence, it is not identified as the matching point. However, such a method alone often results in an erroneous matching, for example, when a point J in the reference image shown in FIG. 4A erroneously extracts a candidate matching point K in the search image shown in FIG. 4B because of a window in the background and the template image prepared around the point K again erroneously extracts the point J in the reference image as a candidate matching point, namely in the case of doubled erroneous extractions, or when a point L in the reference image shown in FIG. 4A correctly extracts a point M in the search image in FIG. 4B, but such a point M erroneously extracts a candidate matching point N in the reference image shown in FIG. 4A because of the tree and the ground in the background.

Figure 31A:
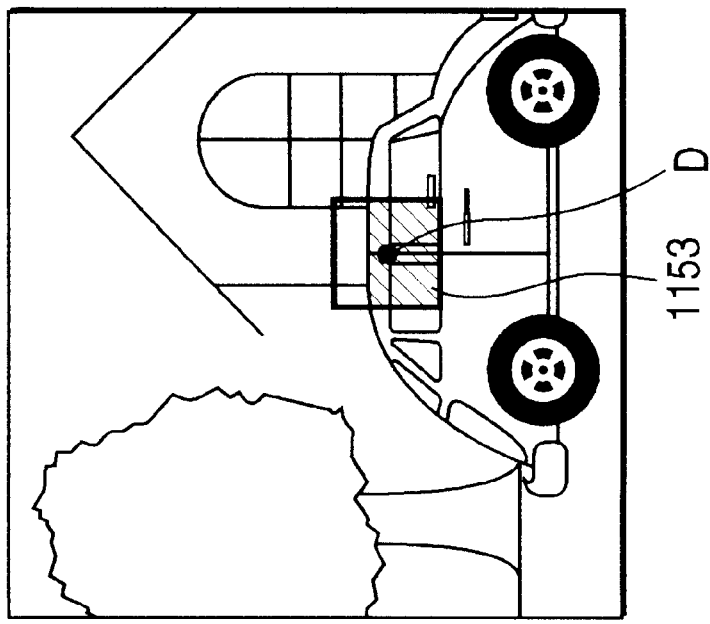
FIGS. 31A and 31B are views showing a template in an area involving a significant change in distance in the above-mentioned apparatus.
Figure 31B:
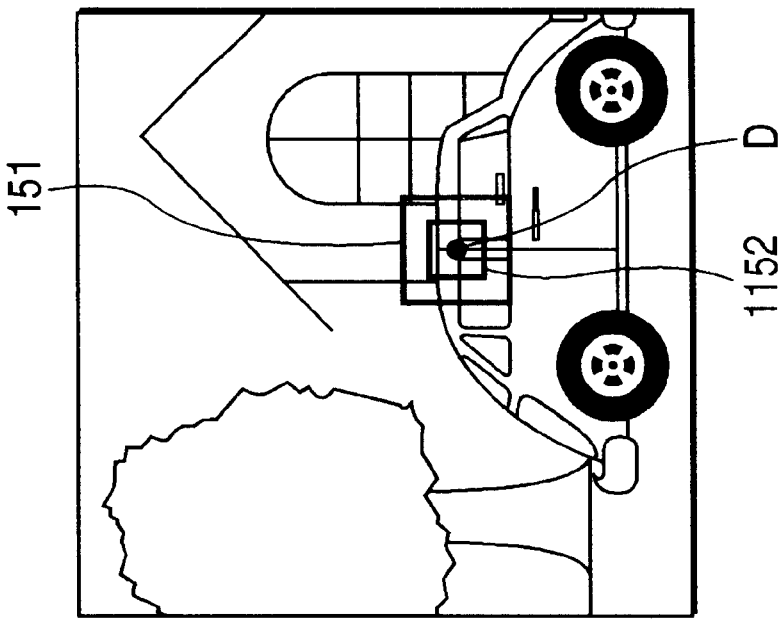

Such a drawback can be avoided by employing, for example, at a point D in the area with a significant variation in the distance, as shown in FIG. 31A, a smaller template 1152 than the template 1151 of a size the same as that of the template used in other areas, or, as shown in FIG. 31B, an area 1153 divided by an edge for the calculation.

The present embodiment is to judge such an occlusion area and the area involving a significant variation in the distance, by adding the judgment based on the evaluation value to the above-mentioned method of obtaining a candidate matching point in the search image, then forming a template around such a candidate matching point, obtaining a candidate matching point in the reference image and judging whether such a candidate matching point coincides with the initial point in the reference image.

In the present embodiment, the process executed by the evaluation function operation unit and the decision unit is different from that in the foregoing fifth to eighth embodiments.

Figure 29:
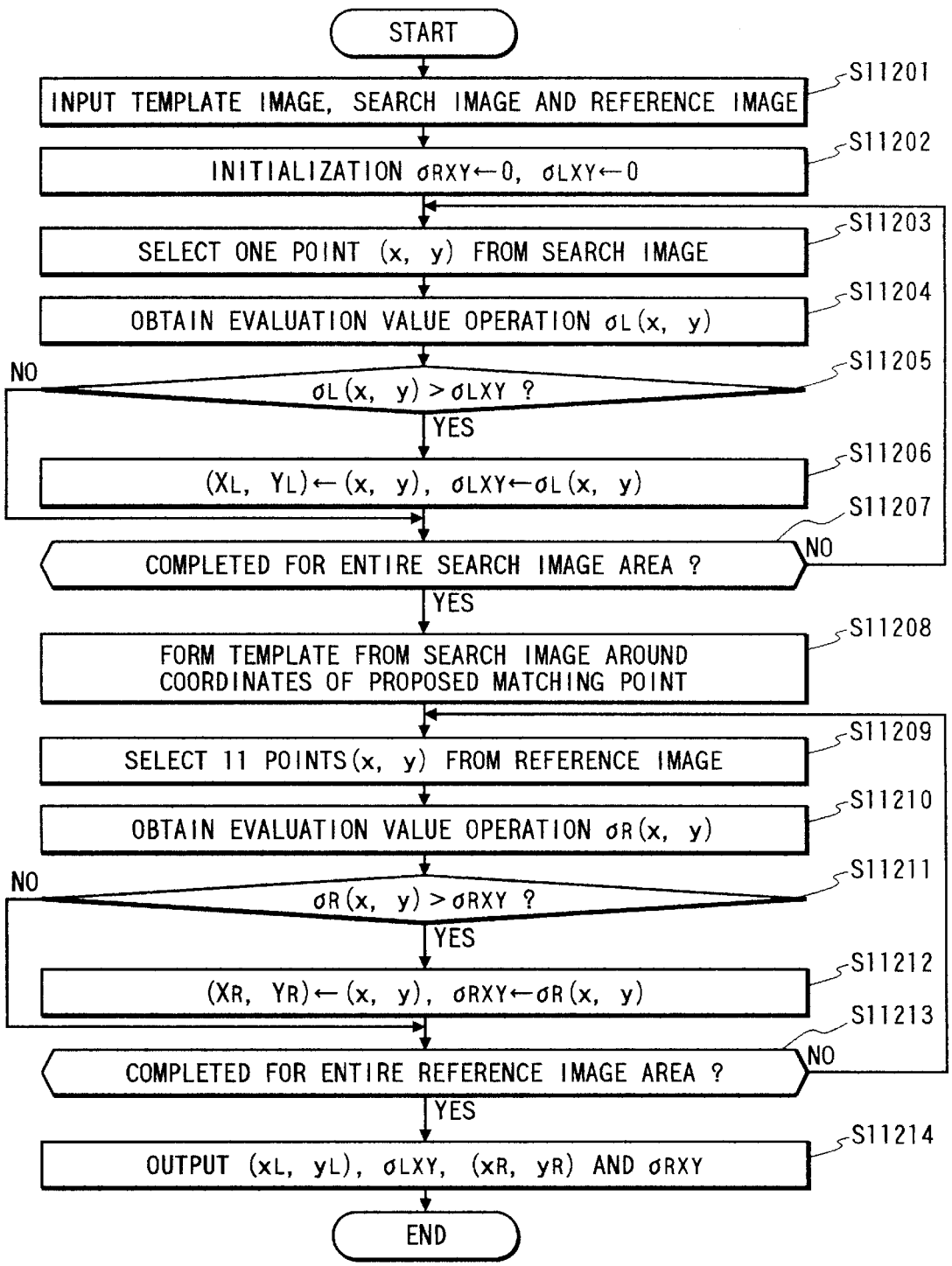
FIG. 29 is a flow chart showing the process of an evaluation function operation unit in a matching point extracting apparatus constituting a ninth embodiment of the present invention.

FIG. 29 is a flow chart showing the process executed by the evaluation function operation unit in the matching point extracting apparatus of the present embodiment. In the present flow chart, the evaluation value is calculated by the correlation value $\sigma(x, y)$ of the aforementioned function (2). Also, the coordinate of the candidate matching point in the search image is represented by (XL, YL), the evaluation value of such a point by $\sigma L(x, y)$, the coordinate of the candidate matching point in the reference image by (XR, YR), and the evaluation value of such a point by $\sigma R(x, y)$.

Referring to FIG. 29, a step S11201 enters a template image and a search image, and a step S11202 initializes the evaluation values ($\sigma R(x, y) = \sigma L(x, y) = 0$). Then, a step S11203 selects a point from the search image, and a step S11204 calculates the evaluation value. A next step S11205 judges whether the evaluation value ($\sigma L(x, y)$) obtained in the step S11204 is higher than the evaluation value ($\sigma L(lX, Y)$) obtained before, and, if higher, a next step S11206 retains the coordinate as a candidate matching point for the template A and then substitutes the evaluation value ($\sigma L(1X, Y)$) obtained before, and the sequence proceeds to a step S11207. On the other hand, if the step S11205 judges that the calculated evaluation value is lower than that obtained before, the sequence proceeds to the step S11207, skipping the step S11206.

The step S11207 judges whether the process has been completed for all the points in the search image, and, if not, the sequence returns to the step S11203 to select a next point in the search image and to again execute the calculation of the evaluation value. On the other hand, if the step S11207 judges that the process has been completed for all the points, a next step S11208 forms a template in the search image, around the coordinate of the candidate matching point. Then a step S11209 selects a point in the reference image, and a step S11210 calculates the evaluation value. A next step S11211 judges whether the evaluation value ($\sigma R(x, y)$) obtained in the step S11210 is higher than the evaluation value ($\sigma R(X, Y)$) obtained before, and, if higher, a next step S11212 retains the coordinate as a candidate matching point for the candidate matching point and substitutes the evaluation value ($\sigma R(X, Y)$) obtained before, and the sequence proceeds to a step S11213. On the other hand, if the step S11211 judges that the calculated evaluation value ($\sigma R(x, y)$) is not higher than the evaluation value ($\sigma R(X, Y)$), the sequence proceeds to the step S11213, skipping the step S11212.

The step S11213 judges whether the process has been completed for all the points in the search image, and, if completed, a next step S11214 outputs the coordinate (XL, YL) of the candidate matching point, the evaluation value σL(x, y) thereof, the coordinate (XR, YR) of the candidate matching point, and the evaluation value σR(x, y) thereof, retained at this point, and the sequence is terminated. On the other hand, if the step S11213 judges that the process is not yet complete, the sequence returns to the step S11209 to select a next point in the search image and to again execute the calculation of the evaluation value.

If the center point of the template image formed from the reference image coincides with the coordinate (XR, YR) of the candidate matching point of the candidate matching point, and if the evaluation values are respectively higher than the threshold values (namely if σL(X, Y)>σHth and σR(X, Y)>σHth wherein σth indicates the threshold value), the decision unit 1108 judges that the candidate matching point is the matching point and outputs such a matching point. On the other hand, if the center point of the template image formed from the reference image does not coincide with the coordinate (XR, YR) of the candidate matching point of the candidate matching point, and if either or both of the evaluation values are lower than the second threshold value (namely if σL(X, Y)<σHth or σR(X, Y)<σHth wherein σLth indicates the threshold value), the center point of the template is judged to belong to an occlusion area and has, therefore, no matching point. In other cases, the center point of the template is judged to belong to an area with a significant variation in the distance, so that, if the template size is large, the evaluation value is calculated again with a change in the template size, but, if the template size is small, the matching point is considered to be unidentifiable.

The above-mentioned concept is summarized in the tables shown in FIGS. 30A to 30D, wherein FIG. 30A indicates a case with a larger-sized template where the center point of the template formed from the reference image coincides with the coordinate (XR, YR) of the candidate matching point of the candidate matching point; FIG. 30B indicates a case with a larger-sized template where the center point of the template formed from the reference image does not coincide with the coordinate (XR, YR) of the candidate matching point of the candidate matching point; FIG. 30C indicates a case with a smaller-sized template where the center point of the template formed from the reference image coincides with the coordinate (XR, YR) of the candidate matching point of the candidate matching point; and FIG. 30D indicates a case with a smaller-sized template where the center point of the template formed from the reference image does not coincide with the coordinate (XR, YR) of the candidate matching point of the candidate matching point.

Also, in FIGS. 30A to 30D, "match" means the determination of the matching point; "large" means the identification of an occlusion area; "small" means the repetition of the evaluation function operation with the reduction of the template size; and "non" means that the matching point is not identified.

As detailedly explained in the foregoing, there are utilized not only the evaluation value, but also the candidate matching point of the candidate matching point for identifying the area with a significant variation in the distance and the occlusion area, thereby avoiding an erroneous matching for a point in the occlusion area and improving the accuracy of the matching point extraction. Also, for the points in other areas, there can be achieved an improvement in the reliability of the candidate matching point.

In the present embodiment, the matching point extraction with the smaller sized template image may result in a case where the candidate matching point cannot be determined as the matching point, as indicated in FIGS. 30C and 30D. In such a case, it is also possible to repeat a similar process for plural images by further reducing the size of the template image or to employ an edge mask template image.

The foregoing fifth to ninth embodiments are applicable not only to the area involving a significant variation in the distance, but also to the moving area of a moving object, since, in such a case, the parallax distribution varies steeply by the moving parallax. Also, as an example of the evaluation function for determining the similarity, there has been employed the correlation value according to the function (2) explained in the prior art, but a similar effect can be obtained with any of the functions (1) to (3). However, according to the experiments of the present inventors, the highest accuracy of the matching point extraction has been attained with the number of pixels within a threshold value defined in the function (3).

Figure 32:
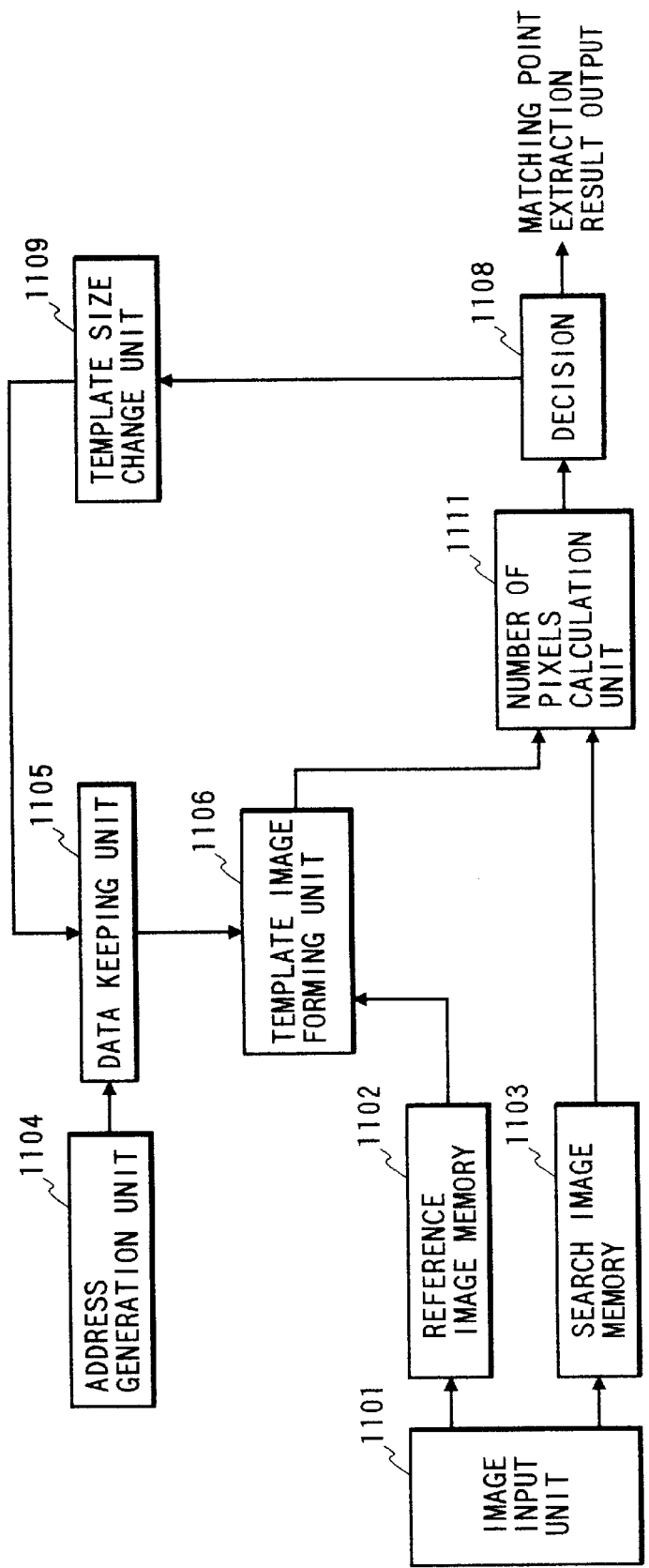
FIG. 32 is a schematic block diagram of a matching point extracting apparatus constituting a tenth embodiment of the present invention.

In the following, there will be explained a tenth embodiment of the present invention, with reference to FIGS. 32 to 36B. FIG. 32 is a block diagram of a matching point extracting apparatus constituting the tenth embodiment, wherein components the same as those in the fifth embodiment shown in FIG. 18 are represented by the same numbers. The configuration shown in FIG. 32 is different from that in FIG. 18 in that the evaluation function operation unit 1107 is replaced by the pixel number calculation unit 1111.

Referring to FIG. 22, images are entered from the image input means with two cameras as shown in FIG. 1A and are respectively stored in the reference image memory 1102 and the search image memory 1103. The address generation unit 1104 sends an address indicating a point in the reference image memory 1102 to the data keeping unit 1105 to determine the template size, in consideration of the template sizes of points around the above-mentioned point. The thus determined template size is supplied from the data keeping unit 1105 to the template image formation unit 1106, which in response forms a template image having the center at a point indicated by the address of the reference image memory 1102 and having a size of the above-mentioned template size. The pixel number calculation unit 1111 effects a calculation, on the template image entered from the template image formation unit 1106 and the search image entered from the search image memory 1103, of the number of pixels in the entire template image showing differences within a threshold value ε between the pixels of the template and a pixel in the search image, according to the function (3) explained in the prior art, and outputs the candidate matching point and the similarity thereof. In the case of the first calculation, the decision unit 1108 judges whether the template size is appropriate, and, if not, it sends a signal to the template size changing unit 1109. Thus, the data of a new template size changed according to such a signal is sent to the data keeping unit 1105, which in turn sends the new template size to the template image formation unit 1106, and the pixel number calculation unit 1111 again calculates the similarity, utilizing a new template formed therein and determines the matching point. If the calculation is for the second time, the result of the matching point extraction is outputted.

In the above-explained configuration, the address generating unit 1104 executes an operation of generating an address indicating a point in the reference image memory 1102, and the data keeping unit 1105 executes an operation of determining the template size of the point indicated by the obtained address, based on the template sizes used in the matching point extracting operations for the points around the above-mentioned point, and sending the thus determined template size to the template image formation unit 1106.

Now the process executed by the data keeping unit 1105 will be explained with reference to a flow chart shown in FIG. 33, wherein the template size used is represented by St, which is set as the initial value at k (St=k; k being a fixed value). Also, the template size sent from the template size changing unit 1109 is represented by Sn, which is a fixed value therein.

Figure 33:
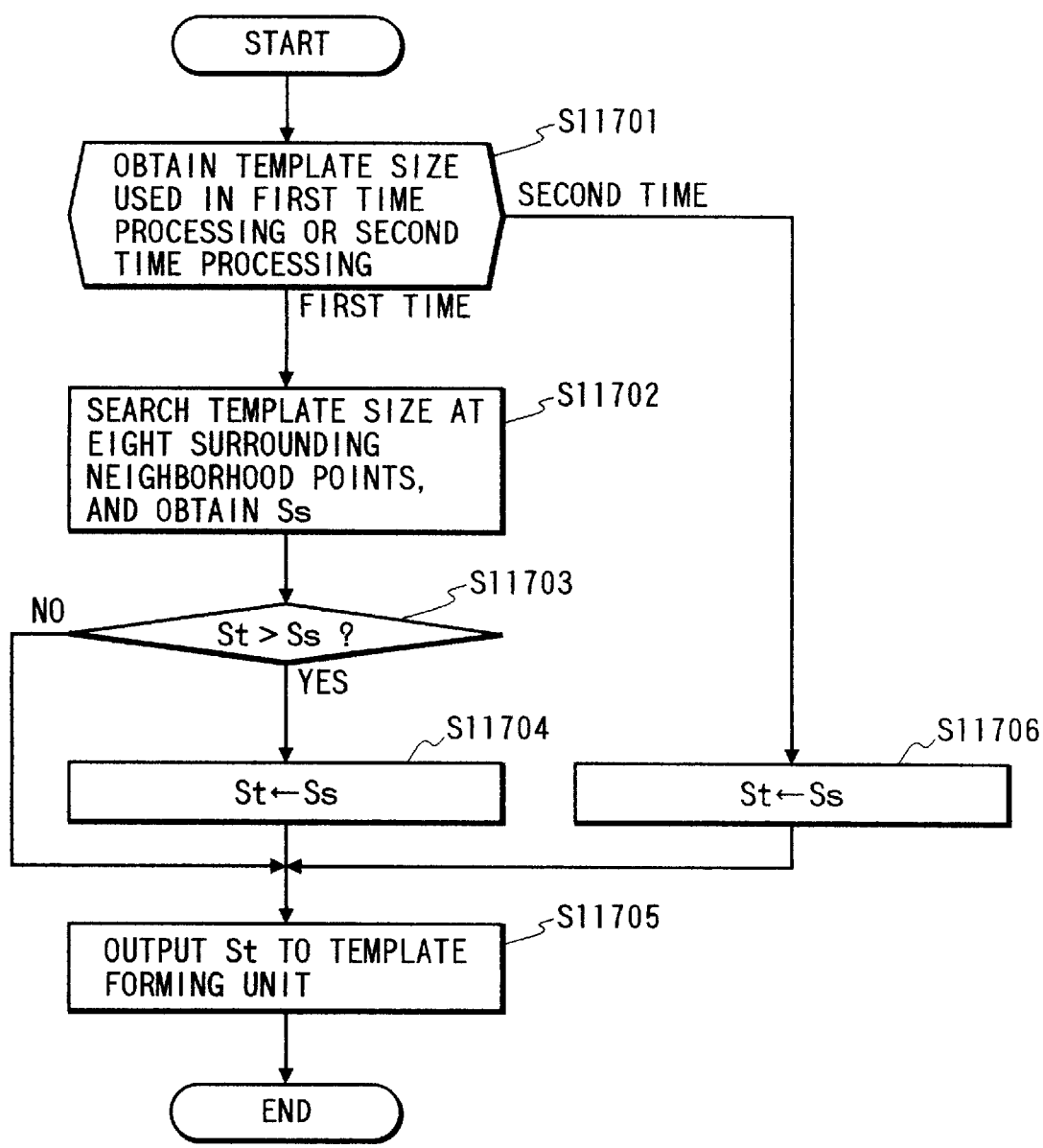
FIG. 33 is a flow chart showing the process of a data keeping unit in the above-mentioned apparatus.

Referring to FIG. 33, a step S11701 judges whether the template size to be determined is for the process of the first time or the second time. In the case of determining the template size to be used for the process of the first time, a next step S11702 investigates the template sizes of 8 points around a point indicated by the address from the address generation unit 1104, and determines the smallest template size Ss. Then, a step S11703 compares the smallest template size Ss among the template sizes for the eight surrounding points with the template size St of the indicated point, and, if St is larger, a next step S11704 selects the smallest template size among the eight surrounding points as the template size of the indicated point (St=Ss), and the sequence proceeds to a step S1705.

On the other hand, when the step S11701 judges that the determination of the template size is for the process of the second time, a step S11706 changes the template size St of the indicated point to the template size Sn supplied from the template size changing unit 1109 (St=Sn), and the sequence then proceeds to the step S11705, which sends the template size St to the template image formation unit 1106.

Such a determination of the template size in consideration of the template sizes of other points provides the ability to obtain an optimum template size and to increase the speed of the matching point extraction.

Subsequently, the template image formation unit 1106 executes an operation of receiving the address from the address generation unit 1104, the template size from the data keeping unit 1105 and the reference image from the reference image memory 1102 and forming the template image, and the pixel number calculation unit 111 executes an operation of calculating the similarity between the template image and the search image based on the aforementioned function (3) and outputting the candidate matching point and the similarity thereof.

Figure 34:
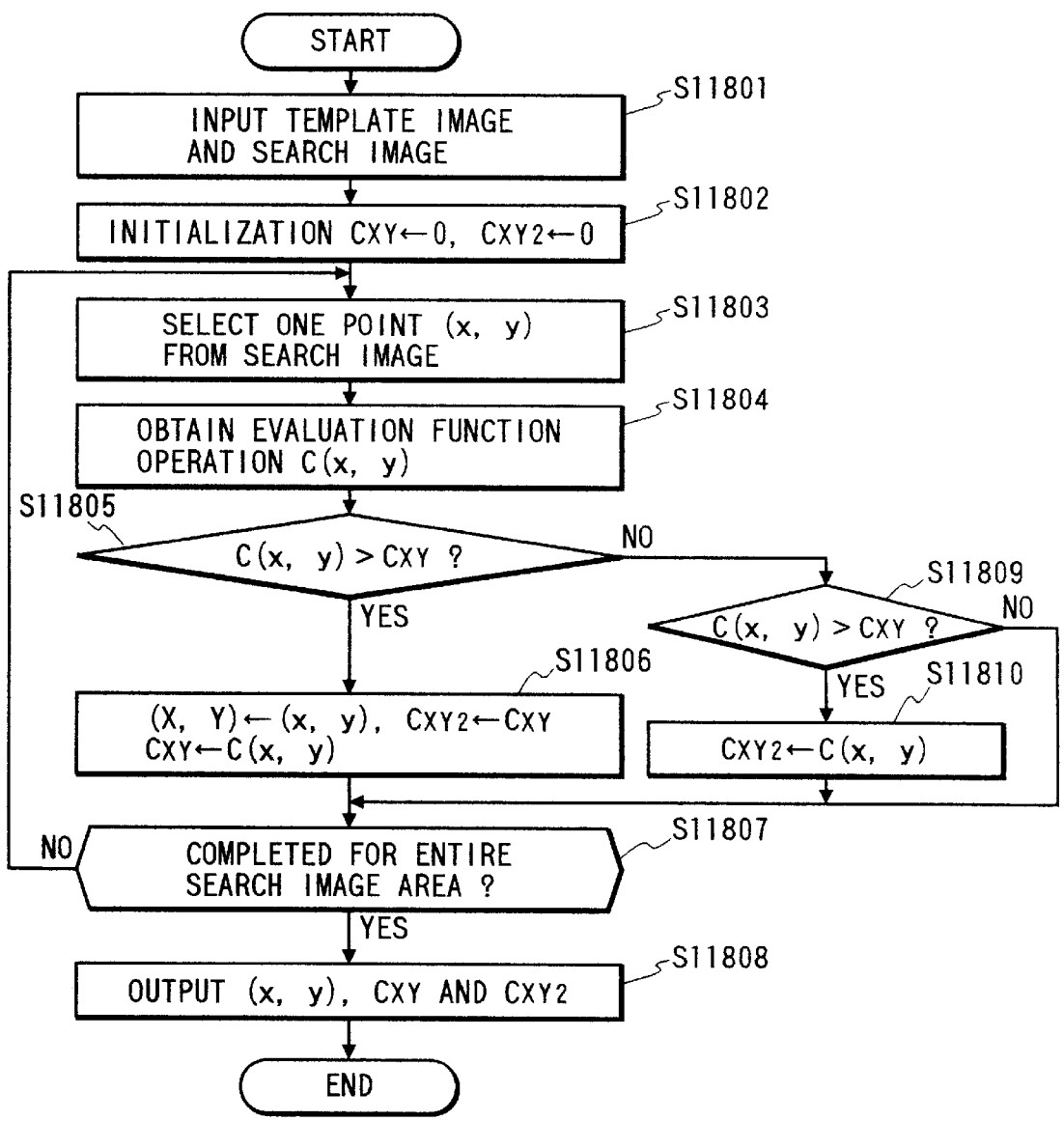
FIG. 34 is a flow chart showing the process of a pixel number calculation unit in the above-mentioned apparatus.

FIG. 34 is a flow chart showing the operation executed by the pixel number calculation unit 1111, wherein (X, Y) indicates the coordinate of the candidate matching point, C(x, y) indicates the similarity calculated for each point (x, y) according to the function (3), Cxy indicates a variable retaining the highest similarity and Cxy2 indicates a variable retaining the second highest similarity.

Referring to FIG. 34, a step S11801 enters a template image and a search image, and a next step S11802 initializes the variables Cxy and Cxy2 (Cxy=0, Cxy2=0). Then, a step S11803 selects a point (x, y) from the search image and matches such a point with the center of the template, and a next step S11804 calculates the similarity C(x, y). Then, a step S11805 judges whether the similarity C(x, y) calculated in the step S11804 is larger than the variable Cxy, and, if larger, a next step S11806 substitutes the coordinate (X, Y) with (x, y) as a candidate matching point, also substitutes the variable Cxy2 with Cxy, and substitutes the variable Cxy with the similarity C(x, y) and the sequence proceeds to a step S11807.

On the other hand, if the step S11805 judges that the similarity C(x, y) is not larger than the variable Cxy, a step S11809 judges whether the similarity C(x, y) is larger than the variable Cxy2, and, if larger, a step S11810 substitutes the variable Cxy2 with the similarity C(x, y) and the sequence proceeds to the step S11807. Also, if the step S11809 judges that the similarity C(x, y) is not larger than the variable Cxy2, the sequence proceeds to the step S11807, skipping the step S11810.

The step S11807 judges whether the process has been completed for all the points in the search image, and, if completed, a next step S11808 outputs the coordinate (X, Y) of the candidate matching point, the highest similarity Cxy and the second highest similarity Cxy2 retained at this point and the sequence is terminated. On the other hand, if the step S11807 judges that the process has not been completed for all the points, the sequence returns to the step S11803 to effect a determination of the similarity for a next point.

The pixel number calculation unit 1111 functions in the above-explained manner.

For the process of the first time with the larger-sized template, the decision unit 1108 executes an operation of judging, based on the obtained similarity, whether the center point of the template belongs to an area involving a significant variation in the distance. Also, in the case of the smaller-sized template, it executes an operation of judging whether the result of extraction is erroneous.

The judgment in the decision unit 1108 whether the center point of the template belongs to the area with a significant variation in the distance is achieved by a comparison of the similarity Cxy and a threshold value Cth. More specifically, for example, in the case of forming a template 1191 around a point P in FIG. 35A and searching a matching point in the image shown in FIG. 35B, the similarity C(x, y), for example on a line L can be plotted as shown in FIG. 36A. As the point P does not belong to the area with a significant variation in the distance, there can be obtained a high peak in the similarity C(x, y) as shown in FIG. 36B, so that the matching point can be determined.

Figure 35A:
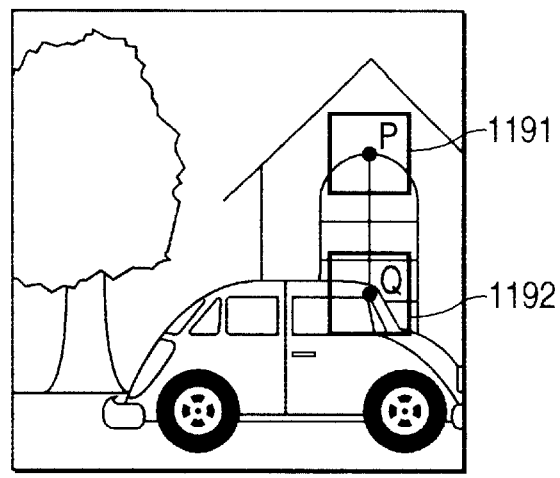
FIGS. 35A, 35B and 35C are views showing templates in an area of a constant distance and in an area of a significantly varying distance, in the above-mentioned apparatus.
Figure 35B:
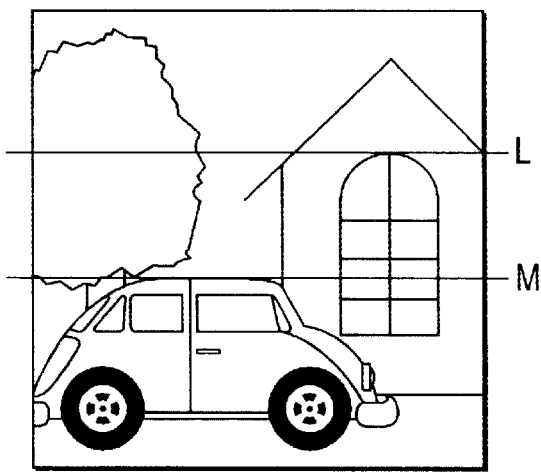
Figure 35C:
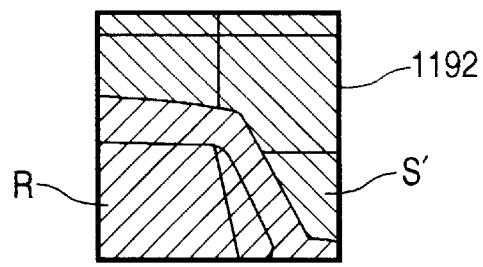
Figure 36A:
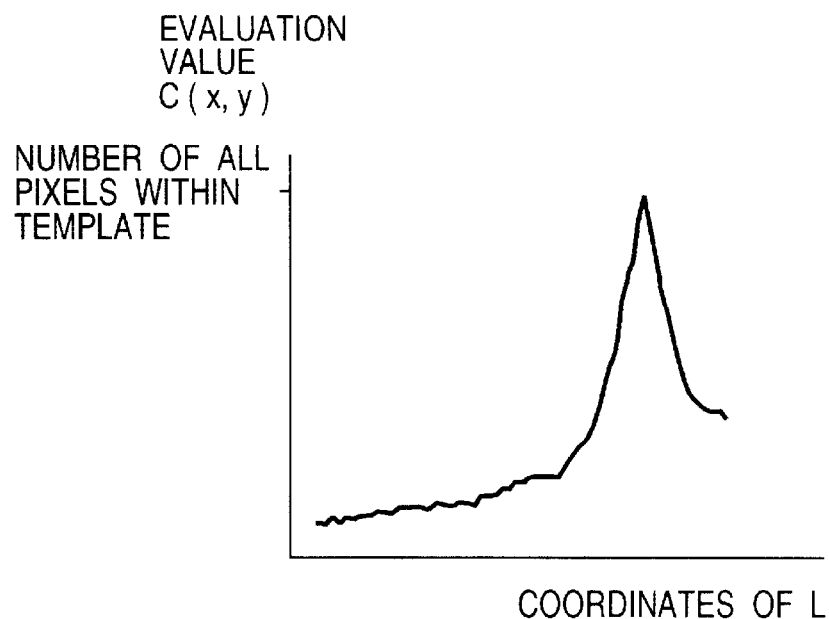
FIGS. 36A and 36B are charts showing similarity in the area of a constant distance and in an area of a significantly varying distance, in the above-mentioned apparatus.
Figure 36B:
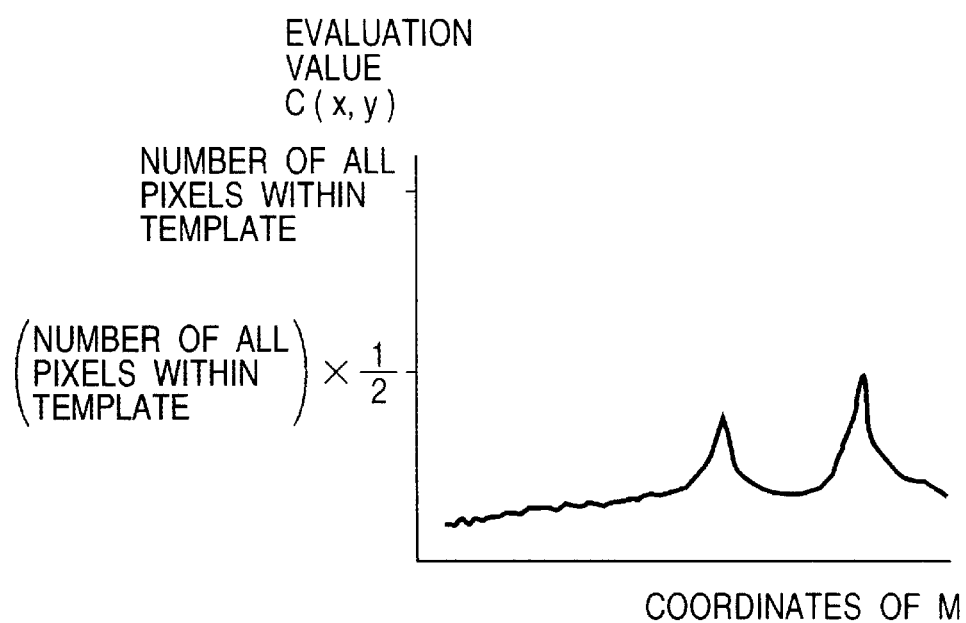

On the other hand, in the case of forming a template 1192 around a point Q in FIG. 35A and searching a matching point in the image shown in FIG. 35B, the similarity C(x, y), for example, on a line M assumes a form as shown in FIG. 36B. This is because the template contains an area involving a significant variation in the distance, and the left-side peak is caused by an increase in the similarity in an area R in the template as shown in FIG. 35C, while the right-side peak is caused by an increase in the similarity in an area S. The similarity of the candidate matching point for a point present in such an area with a significant variation in the distance becomes considerably lower than those for points in other areas. Based on these facts, the comparison of the similarity and a certain threshold value Cth provides the ability to judge whether the center point of the template belongs to an area with a significant variation in the distance.

Also, the judgment whether the result of the extraction with the smaller-size template is erroneous is based on the absolute value of the difference between the highest similarity Cxy and the second highest similarity Cxy2. A considerably small difference between Cxy and Cxy2 is judged to indicate an erroneous extraction of a similar point because of the small template size. As explained in the foregoing description of the prior art and the drawbacks thereof, when there exist plural similar areas such as the sky, a smaller-sized template may provide approximately the same similarities in plural locations. In order to identify such a situation, there is investigated whether approximately the same similarities are given in a plural number. When the center point of the template does not belong to an area with a significant variation in the distance and the result of the extraction is not erroneous, the decision unit 1108 outputs the result of the matching point extraction. It also outputs such a result when the process is for the second time.

The template size changing unit 1109 executes an operation of changing the template size and sending the new template size Sn to the data keeping unit 1105, when the decision unit 1108 judges that the center point of the template belongs to an area with a significant variation in the distance or that the result of the extraction is erroneous.

The configuration shown in FIG. 32, consisting of the components of the above-explained functions, provides the ability to select a template according to the area in the image, thereby enabling highly a precise extraction of the matching point and a highly precise determination of the distance distribution of the object. It also enables a reduction in the time required for the template selection.

The present embodiment employs two template sizes, namely larger and smaller, but there may also be employed template sizes of a larger number, for example, by further reducing the size of the template when the background still occupies a larger portion even with the smaller-sized template.

Also, the present embodiment employs the function (3) explained in the prior art, for determining the similarity, but there may be employed any of the functions (1) to (3) or any other new similarity.

As explained in the foregoing, the present embodiment has shown the template matching with plural template sizes and the judging method for selecting the template size.

In the following, there will be explained an eleventh embodiment of the present invention, with reference to FIGS. 37 and 38.

Figure 37:
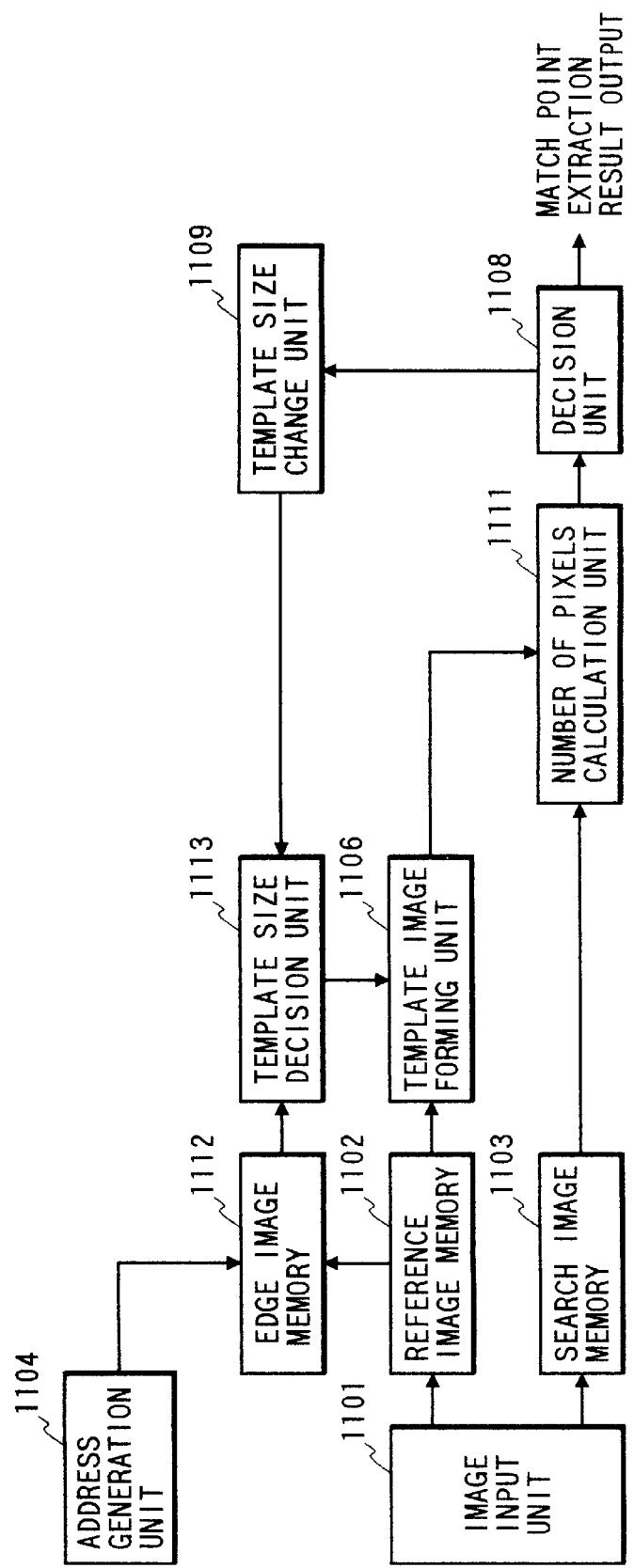
FIG. 37 is a schematic block diagram of a matching point extracting apparatus constituting an eleventh embodiment of the present invention.

FIG. 37 is a block diagram of a matching point extracting apparatus constituting the eleventh embodiment, wherein components the same as those in the tenth embodiment shown in FIG. 32 are represented by the same numbers. The configuration shown in FIG. 37 is different from that in FIG. 32 in that the data keeping unit 1105 is replaced by an edge image memory 1112 and a template size decision unit 1113.

Referring to FIG. 22, as in the tenth embodiment, images are entered from the image input means 1101 and are respectively stored in the reference image memory 1102 and the search image memory 1103. The address generation unit 1104 sends an address indicating a point in the reference image memory 1102 and in the edge image memory 1112 thereto. The edge image memory 1112 stores an edge image, obtained, for example, by Zobel filtering from the image obtained from the reference image memory 1102. Then, an edge template of a predetermined size is formed around such a point and is sent to the template size decision unit 1113.

The template size decision unit 1113 judges whether a strong edge is present in the obtained edge template, and, if present, reduces the template size, but, if absent, enlarges the template size, and sends the template size to the template image formation unit 1106, which in response forms a template image having the center at a point indicated by the address of the reference image memory 1102 and having a size of the above-mentioned template size.

The pixel number calculation unit 1111 effects a calculation, on the template image entered from the template image formation unit 1106 and the search image entered from the search image memory 1103, of the number of pixels in the entire template image showing differences within a threshold value ε between the pixels of the template and a pixel in the search image, according to the function (3) explained in the prior art, and outputs the candidate matching point and the similarity thereof.

In the case of the first calculation, the decision unit 1108 judges whether the template size is appropriate, and, if not, it sends a signal to the template size changing unit 1109. Thus, a new template size is sent to the template image formation unit 1106, and the pixel number calculation unit 1111 again calculates the similarity, utilizing a new template formed therein and determines the matching point. If the calculation is for the second time, the result of the matching point extraction is outputted.

The above-explained configuration differs from that of the foregoing tenth embodiment in the edge image memory 1112 and the template size decision unit 1113.

In the following, the function of the template size decision unit 1113 will be explained with reference to a flow chart shown in FIG. 38.

Figure 38:
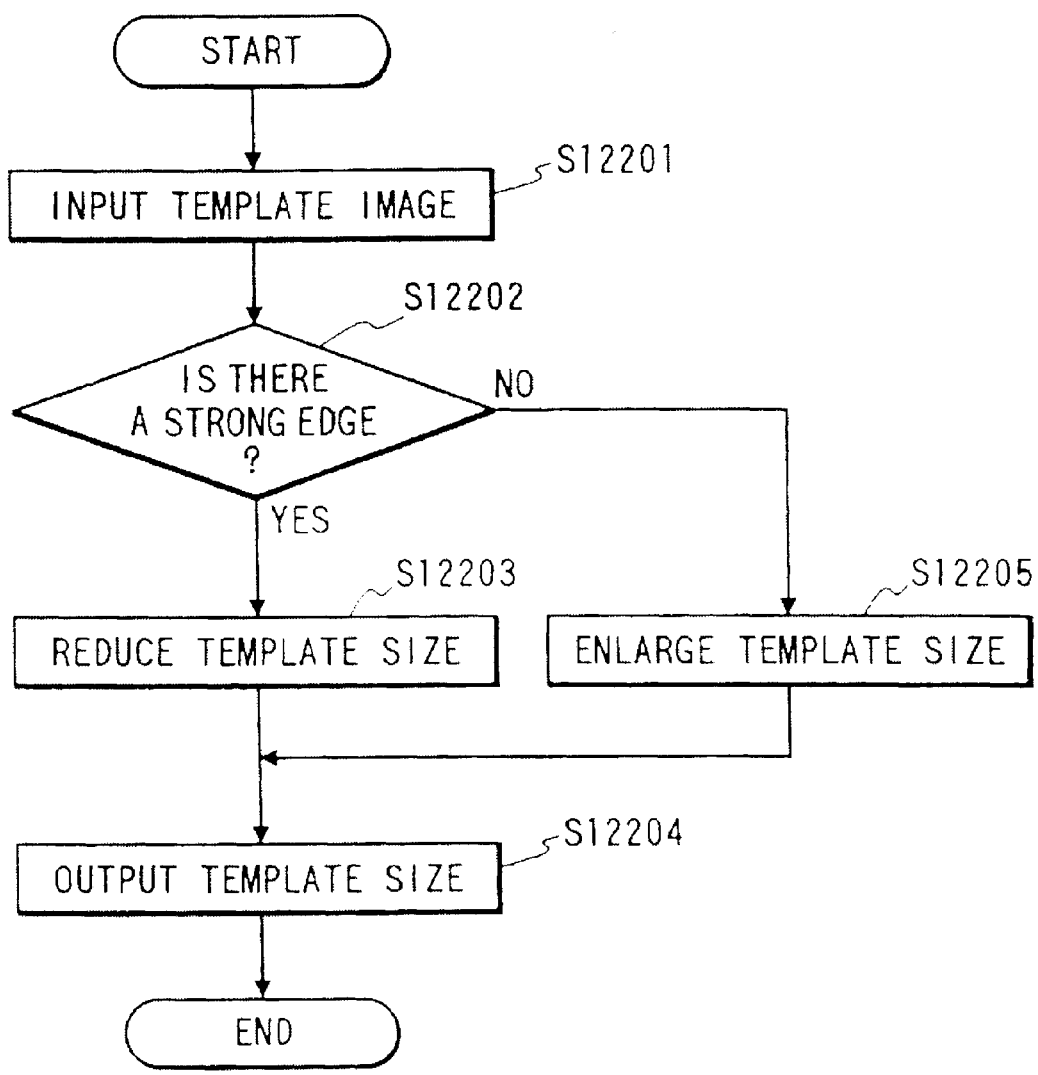
FIG. 38 is a flow chart showing the process in a template size decision unit in the above-mentioned apparatus.

Referring to FIG. 38, a step S12201 enters an edge template image, and a step S12202 judges whether the entered edge template image contains a strong edge, by discriminating whether any edge exceeds a certain threshold value. If such a strong edge is present, a next step S12203 reduces the template size and the sequence proceeds to a step S12204. If the step S12202 judges that such a strong edge is absent, a step S12205 enlarges the template size and the sequence proceeds to the step S12204. The step S12204 outputs the template size processed in the step S12203 or S12205 and the sequence is terminated.

Since the area involving a significant variation in the distance often contains a strong edge, the present embodiment reduces the template size to be used, for example, by Zobel filtering, when the determined edges contain a strong edge, thereby improving the efficiency of the matching point extraction.

Also, even if the selection of the template size is inappropriate, the present embodiment enables a change of the template size afterwards, so that there can be prevented the deterioration of the accuracy resulting from such an error in the selection of the template size. In addition, the accuracy of the matching point extraction can be improved since the template can be adjusted in size, matching respective areas.

In the following, there will be explained a twelfth embodiment of the present invention, with reference to FIG. 39, which is a block diagram of a matching point extracting apparatus constituting the twelfth embodiment, wherein components the same as those in the tenth embodiment shown in FIG. 32 are represented by the same numbers. The configuration shown in FIG. 39 is different from that in FIG. 32 in that the address generation unit 1104 is connected to the data keeping unit 1105.

Figure 39:
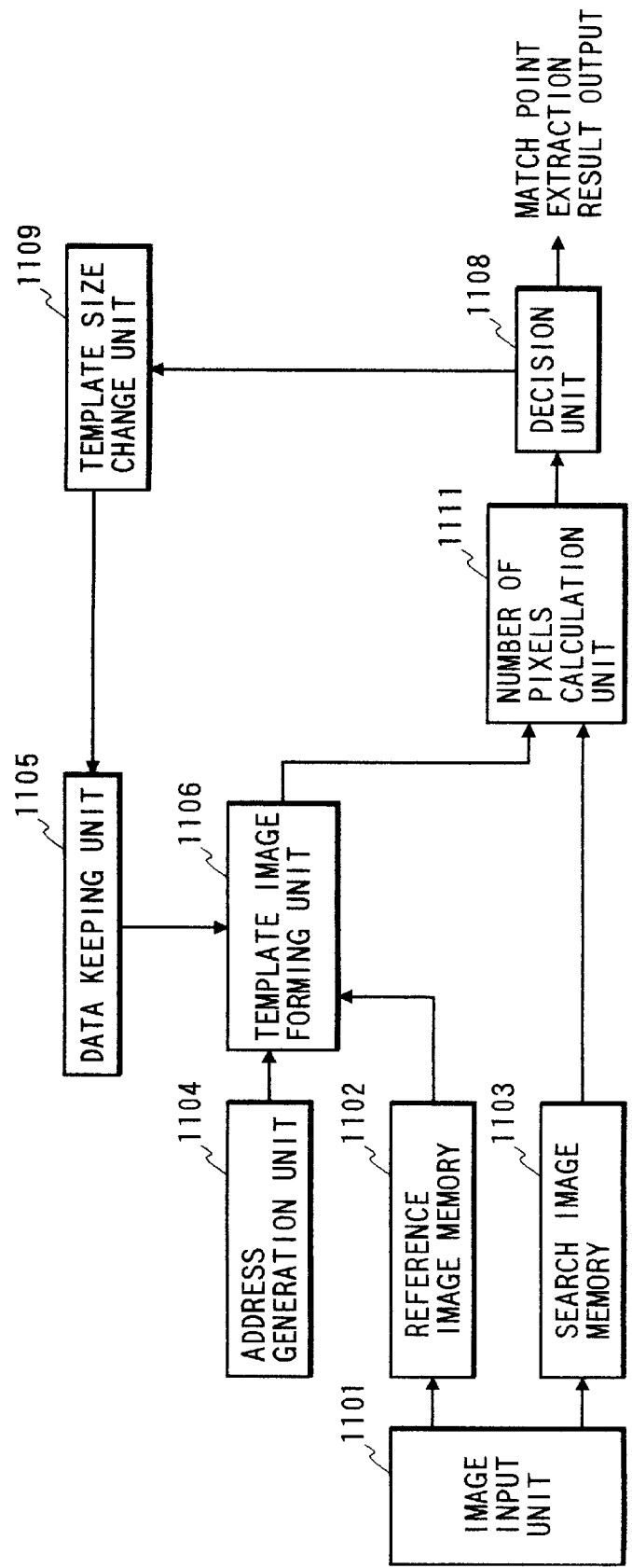
FIG. 39 is a schematic block diagram of a matching point extracting apparatus constituting a twelfth embodiment of the present invention.

Referring to FIG. 39, images are entered from the image input means 1101 provided with two cameras as shown in FIG. 1A and are respectively stored in the reference image memory 1102 and the search image memory 1103. The address generation unit 1104 sends an address indicating a point in the reference image memory 1102, while the data keeping unit 1105 sends a template size, to the template image formation unit 1106, which in response forms a template image having the center at a point indicated by the address of the reference image memory 1102 and having a size of the above-mentioned template size. The pixel number calculation unit 1111 effects a calculation, on the template image entered from the template image formation unit 1106 and the search image entered from the search image memory

1103, of the number of pixels in the entire template image showing differences within a threshold value ε between the pixels of the template and a pixel in the search image, according to the function (3) explained in the prior art, and outputs the candidate matching point and the similarity thereof.

In the case of the first calculation, the decision unit 1108 judges whether the template size is appropriate, and, if not, it sends a signal to the template size changing unit 1109, which in response changes the template size. Thus, a changed new template size is sent to the template image formation unit 1106, and the pixel number calculation unit 1111 again calculates the similarity, utilizing a new template formed therein and determines the matching point. If the calculation is for the second time, the result of the matching point extraction is outputted.

The configuration shown in FIG. 39 differs from that of the tenth embodiment shown in FIG. 32, in the function of the data keeping unit 1105, as will be explained in the following.

The data keeping unit 1105 keeps a template size, and changes such a size when the decision unit 1108 judges that the template size is inappropriate. The template size thus changed remains effective also for the next point. Stated differently, the template size for a point is the same as that for an immediately preceding point.

As explained in the foregoing, based on a fact that the area of an edge for which the template size should be reduced is continuous, the template size for a point is maintained the same as that for an immediately preceding point. Thus, the template is maintained in an appropriate size by an extremely simple algorithm and the efficiency of the matching point extraction can be improved. Also, even if the selection of the template size is inappropriate, the present embodiment enables a change of the template size afterwards, so that there can be prevented the deterioration of the accuracy resulting from such an error in the selection of the template size. In addition, the accuracy of the matching point extraction can be improved since the template can be adjusted in size, matching respective areas.

As detailedly explained in the foregoing, the matching point extracting apparatus of the present invention enables highly precise matching point extraction in the entire area of the image to be used, without distinction between the object and the background therein, and provides advantages of an improved processing speed and an improved accuracy for the identification of the occlusion area.

Also, the matching point extracting apparatus of the present invention, capable of using templates matching the partial features of the image to be used, provides an advantage of achieving highly precise matching point extraction over the entire image area.

Furthermore, the matching point extracting apparatus of the present invention, being capable of employing an appropriate template size from the beginning, provides an advantage of increasing the processing speed, and, being also capable of varying the template size afterwards, provides an advantage of achieving highly precise matching point extraction.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method comprising:
   a template image forming step for forming a template image area within an image among plural inputted images;
   a comparing step for performing a similarity comparison on the basis of the template image area and a search area selected from among one of the plural inputted images other than the image in which the template image area is formed;
   a step of identifying the number of portions in the search area similar to the template image area on the basis of the similarity comparison results in said comparing step; and
   a changing step for changing the template image area to another, different template image area when the number of portions identified in said identifying step as being similar to the template image area is plural, and repeating said comparing step on the basis of the different template image area.

2. An image processing method according to claim 1, wherein the similarity comparison performed in connection with said comparing and changing steps is performed in accordance with a number of pixels showing differences in a value of the pixel data within a predetermined range with respect to each pixel constituting the template image area.

3. An image processing method according to claim 2, wherein the repeating of the similarity comparison in said changing step is executed in a case that the similarity of an identified portion is smaller than a predetermined value.

4. An image processing method according to claim 1, wherein the another, different area is included within the area of the template image area used in said comparing step and is reduced in size.

5. An image processing method according to claim 1, wherein the another, different area is formed via an edge of the area of the template image area used in said comparing step that is assumed to be a boundary so as not to use a part of the template image area used in said comparing step.

6. An image processing method according to claim 2, wherein a value of a luminance of each pixel is used as the value of the pixel data.

7. An image processing method according to claim 2, wherein a value of a color component of each pixel is used as the value of the pixel data.

8. An image processing apparatus comprising:
   a template image forming means for forming a template image area within an image among plural inputted images;
   similarity comparison means for performing a similarity comparison on the basis of the template image area and a search area selected from among one of the plural inputted images other than the images in which the template image area is formed;
   identifying means for identifying a number of portions in the search area similar to the template image area on the basis of similarity comparison results by said similarity comparison means; and
   changing means for changing the template image area to another, different template image area when the number of portions identified by said identifying means as being similar to the template image area is plural, and repeating the operation of said similarity comparison means on the basis of the different template image area.

9. An image processing apparatus according to claim 8, wherein the similarity comparison performed in connection with said similarity comparison means and said changing means is performed in accordance with a number of pixels showing differences in a value of the pixel data within a predetermined range with respect to each pixel constituting the template image area.

10. An image processing apparatus according to claim 9, wherein the repeating of the similarity comparison by said changing means is executed in a case that the similarity of an identified portion is smaller than a predetermined value.

11. An image processing apparatus according to claim 8, wherein the another, different area is included within the area of the template image area used by said similarity comparison means and is reduced in size.

12. An image processing apparatus according to claim 8, wherein the another, different area is formed via an edge of the area of the template image area used in said similarity comparison means that is assumed to be a boundary so as not to use a part of the template image area used in said similarity comparison means.

13. An image processing apparatus according to claim 9, wherein a value of a luminance of each pixel is used as the value of the pixel data.

14. An image processing apparatus according to claim 9, wherein a value of a color component of each pixel is used as the value of the pixel data.

15. In an image processing arrangement, a computer usable medium having computer readable program units embodied therein comprising:
 a template image forming program unit for forming a template image area within an image among plural inputted images;
 a comparing program unit for performing a similarity comparison on the basis of the template image area and a search area selected from among one of the plural inputted images other than the image in which the template image area is formed;
 an identifying program unit of identifying the number of portions in the search area similar to the template image area on the basis of the similarity comparison results in said comparing program unit; and
 a changing program unit for changing the template image area to another, different template image area when the number of portions identified in said identifying program unit as being similar to the template image area is plural, and repeating operation of said comparing program unit on the basis of the different template image area.

16. In an image processing arrangement, a computer usable medium having computer readable program units embodied therein according to claim 15, wherein the similarity comparison performed in connection with said comparing and changing program units is performed in accordance with a number of pixels showing differences in a value of the pixel data within a predetermined range with respect to each pixel constituting the template image area.

17. In an image processing arrangement, a computer usable medium having computer readable program units embodied therein according to claim 16, wherein the repeating of the similarity comparison in said changing program unit is executed in a case that the similarity of an identified portion is smaller than a predetermined value.

18. In an image processing arrangement, a computer usable medium having computer readable program units embodied therein according to claim 15, wherein the another, different area is included within the area of the template image area used in said comparing program unit and is reduced in size.

19. In an image processing arrangement, a computer usable medium having computer readable program units embodied therein according to claim 15, wherein the another, different area is formed via an edge of the area of the template image area used in said comparing program unit that is assumed to be a boundary so as not to use a part of the template image area used in said comparing program unit.

20. In an image processing arrangement, a computer usable medium having computer readable program units embodied therein according to claim 16, wherein a value of a luminance of each pixel is used as the value of the pixel data.

21. In an image processing arrangement, a computer usable medium having computer readable program units embodied therein according to claim 16, wherein a value of a color component of each pixel is used as the value of the pixel data.

* * * * *

UNITED STATES PATENT AND TRADEMARK OFFICE
CERTIFICATE OF CORRECTION

PATENT NO. : 6,493,465 B2
DATED : December 10, 2002
INVENTOR(S) : Katsuhiko Mori et al.

It is certified that error appears in the above-identified patent and that said Letters Patent is hereby corrected as shown below:

Column 1,
Line 41, "Also" should read -- Also, --.

Column 3,
Line 25, "results" should read -- results, --.

Column 4,
Line 41, "erroneous" should read -- an erroneous --.
Line 48, "in case" should read -- in the case --.

Column 7,
Line 48, "showing" should read -- showing a --.

Column 9,
Line 25, "value e" should read -- value $\varepsilon$ --.

Column 20,
Line 6, "on a" should read -- on $\sigma$ --.
Line 27, "value a" should read -- value $\sigma$ --.

Column 23,
Line 12, "involving" should read -- involving a --.
Line 43, "time" should read -- time, --.

Column 26,
Line 51, "Then" should read -- Then, --.

UNITED STATES PATENT AND TRADEMARK OFFICE
CERTIFICATE OF CORRECTION

PATENT NO. : 6,493,465 B2
DATED : December 10, 2002
INVENTOR(S) : Katsuhiko Mori et al.

It is certified that error appears in the above-identified patent and that said Letters Patent is hereby corrected as shown below:

Column 30,
Line 33, "example" should read -- example, --.

Signed and Sealed this

Twenty-sixth Day of August, 2003

JAMES E. ROGAN
*Director of the United States Patent and Trademark Office*